US009436848B2

(12) United States Patent
Beitel et al.

(10) Patent No.: US 9,436,848 B2
(45) Date of Patent: Sep. 6, 2016

(54) CONFIGURATOR FOR SECURE FEATURE AND KEY MANAGER

(71) Applicant: Cryptography Research, Inc., San Francisco, CA (US)

(72) Inventors: Daniel Beitel, San Francisco, CA (US); Lauren Gao, San Bruno, CA (US); Christopher Gori, San Francisco, CA (US); Paul Carl Kocher, San Francisco, CA (US); Ambuj Kumar, Sunnyvale, CA (US); Andrew John Leiserson, San Francisco, CA (US)

(73) Assignee: CRYPTOGRAPHY RESEARCH, INC., San Francisco, CA (US)

( * ) Notice: Subject to any disclaimer, the term of this patent is extended or adjusted under 35 U.S.C. 154(b) by 132 days.

(21) Appl. No.: 14/289,274

(22) Filed: May 28, 2014

(65) Prior Publication Data
US 2014/0359755 A1 Dec. 4, 2014

Related U.S. Application Data
(60) Provisional application No. 61/829,173, filed on May 30, 2013.

(51) Int. Cl.
G06F 11/30 (2006.01)
G06F 21/76 (2013.01)
G06F 21/57 (2013.01)

(52) U.S. Cl.
CPC ............ *G06F 21/76* (2013.01); *G06F 21/572* (2013.01)

(58) Field of Classification Search
CPC ................................ G06F 21/72; G06F 21/76
USPC .................................................. 713/189–194
See application file for complete search history.

(56) References Cited

U.S. PATENT DOCUMENTS

| | | | | |
|---|---|---|---|---|
| 7,952,387 | B1* | 5/2011 | Frazer ................ | G06F 17/5054 326/38 |
| 8,909,941 | B1* | 12/2014 | Trimberger ............ | G06F 21/64 713/190 |
| 2001/0056540 | A1* | 12/2001 | Ober ...................... | G06F 21/72 713/193 |
| 2007/0277036 | A1* | 11/2007 | Chamberlain ......... | G06F 3/061 713/171 |
| 2013/0117577 | A1* | 5/2013 | Hars .................... | G06F 12/1408 713/190 |

(Continued)

OTHER PUBLICATIONS

Li et al., "An automatic circuit extractor for RTL verification," Test Symposium, 2003. ATS 2003. 12th Asian Year: 2003 pp. 154-160.*

(Continued)

*Primary Examiner* — Roderick Tolentino
(74) *Attorney, Agent, or Firm* — Lowenstein Sandler LLP

(57) ABSTRACT

A computing device receives a feature name or key name for an integrated circuit comprising a security manager core and an additional component. At least one of a) the additional component is associated with the key name or b) a feature provided by the additional component is associated with the feature name. The computing device receives a specified number of bits associated with the feature name or the key name, and maps the feature name to a feature address space or the key name to a key interface of the security manager core based at on the specified number of bits. The computing device generates at least one hardware description logic (HDL) module based on the mapping, wherein the at least one HDL module is usable to configure the security manager core for delivery of payloads associated with the feature name or the key name to the additional component.

19 Claims, 15 Drawing Sheets

(56) References Cited

U.S. PATENT DOCUMENTS

2013/0208892 A1* 8/2013 Moriguchi .............. G06F 21/805
 380/277
2013/0339761 A1* 12/2013 Abhishek .............. G06F 1/3287
 713/300

OTHER PUBLICATIONS

Liu et al., "An automatic controller extractor for HDL descriptions at the RTL," IEEE Design & Test of Computers Year: 2000, vol. 17, Issue: 3 pp. 72-77.*

* cited by examiner

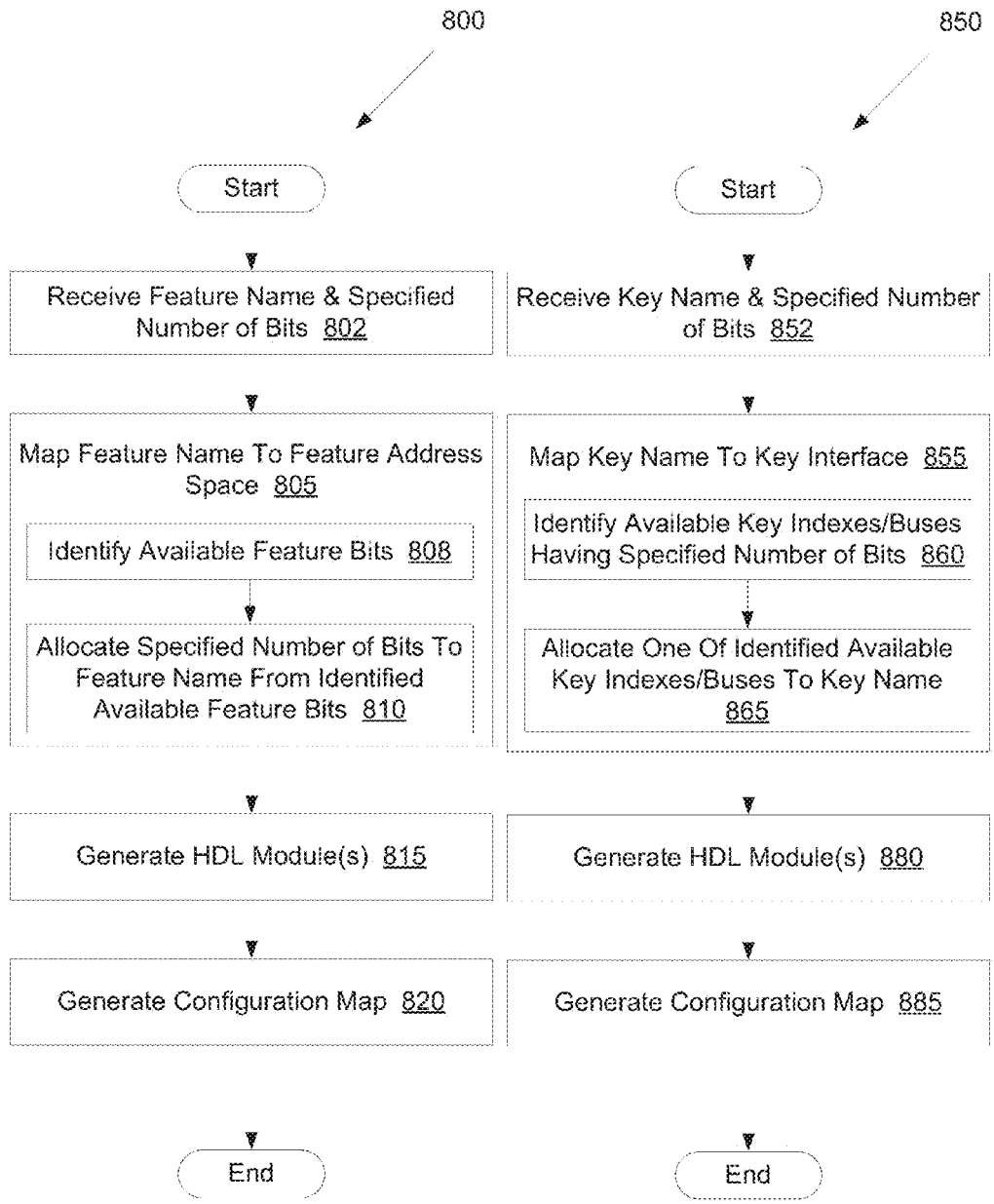

CONFIGURATOR FOR SECURE FEATURE AND KEY MANAGER

RELATED APPLICATIONS

This patent application claims the benefit under 35 U.S.C. §119(e) of U.S. Provisional Application No. 61/829,173, filed May 30, 2013.

BACKGROUND

Presently, system-on-a-chip vendors may sell many different varieties of the same chip, where each variety is configured for a particular application. Chip configuration often occurs by blowing one or more fuses or otherwise programming a one-time programmable memory on the chip. This type of chip configuration is generally a one-way process and cannot be undone. One method of circumventing the permanence of the configuration process is to add redundant or spare bits within the one-time programmable memory that can be combined to modify a previous setting (e.g., by exclusive-ORing multiple bits together to produce the final configuration setting). This type of redundancy has limited flexibility, however, and requires additional fuses which take up additional real estate on the chip. In addition, having multiple fuses behind a setting does not remove the need to perform multiple programming steps to configure chips adds cost. Likewise, configurations today continue to be performed by chip vendors (or their contractors), who then maintain inventories of chips with multiple fuse configurations.

The need for secure systems and applications is growing. Presently, allegedly secure chips are often programmed with security keys on the factory floor. Secure keys may be used in a variety of ways, such as, for example, to protect stored data, control access to digital content, or encrypt/authenticate data used in transactions. Today, these keys can be stored in a one-time programmable memory, which may hold keys directly or hold a base key that is used with cryptographic functions that derive keys for various functions. Typically, security is provided by performing the key loading process in a secured facility.

BRIEF DESCRIPTION OF THE DRAWINGS

Reference will now be made to the accompanying drawings showing example embodiments of the present application, and in which:

FIG. 8A is a flow chart of one example for utilizing a configurator system to map features to a feature address space of a security manager in an IC.

FIG. 8B is a flow chart of one example for utilizing a configurator system to map key names to key indexes of a security manager core.

DESCRIPTION OF EXAMPLE EMBODIMENTS

Embodiments are directed to a configurator (also referred to herein as a configurator system) for integrated circuits (ICs) that incorporate a security manager core. The configurator manages mappings of customer device specific features to a feature space of the security manager core, and the mappings of customer device specific keys to a key interface of the security manager core (e.g., to key buses of the security manager core). The configurator may additionally determine mappings or routings between the security manager core and additional components in an integrated circuit. Once the integrated circuit design is complete, the configurator additionally generates compiler mapping files, firmware mapping files and/or design documentation based on the determined mapping. The configurator may significantly reduce an amount of design work that an engineer performs to configure and lay out an integrated circuit that includes a security manager core.

Reference will now be made in detail to the present example embodiments illustrated in the accompanying drawings.

1. Concepts 1.1. Ecosystem Overview

Figure 1A:
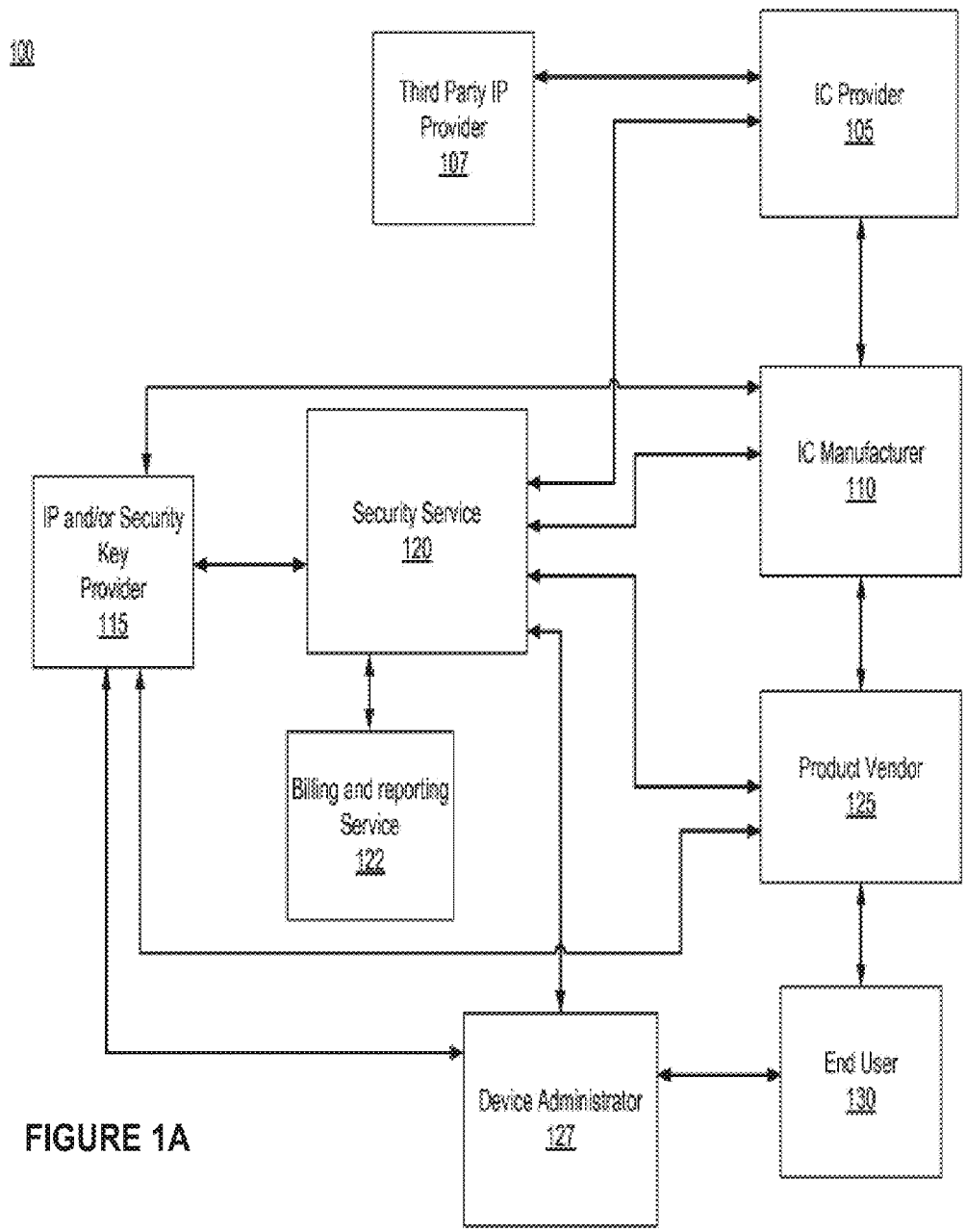
FIG. 1A is a block diagram depicting an example ecosystem.

Reference is now made to FIG. 1A, which shows, in block diagram form, an example ecosystem 100. As shown in FIG. 1A, system 100 may include an integrated circuit ("IC") provider 105, a third party IP provider 107, an IC manufacturer 110, an IP and/or security key provider 115, a security service 120, a billing and reporting service 122, a product vendor 125, a device administrator 127, and an end user 130. For simplicity, in this example ecosystem, only one of each entity is shown. In practice, an ecosystem consistent with the principles described herein may have one or more of each entity (i.e. multiple IC manufacturers supplying identical ICs, multiple product vendors providing products that utilize the same IC design, and multiple customers). Some steps shown in FIG. 1A may also involve several companies (e.g.

IC fabrication may involve different companies and/or stages to manufacture wafers, perform initial testing, cut wafers, package chips, etc.). Additionally, in some instances, some entities and their functions could be contained within a single entity. For example, some companies both design and manufacture ICs, in which case IC manufacturer 110 and IC provider 105 could be the same entity.

IC provider 105 is an entity which provides chip designs to IC manufacturer 110 for chip production. Specifically, IC provider 105 provides chip designs for configurable ICs, such that some aspects of the chip may be configured (e.g., for specific applications or to enable/disable particular features) after manufacture. For example, IC provider 105 can include in the design a security manager ("SM") core, or can specify that the manufactured IC includes an SM core. An IC including an SM core is referred to as a SM-enabled IC. Among other things, the SM core allows one or more configurable features ("Features") of the IC to be locked or unlocked (or otherwise configured, e.g., such as tuning a PLL to adjust a CPU's performance or delivering a secret key for use by the Feature) depending on the desired configuration and security needs. An SM-enabled IC includes, for example, one (or possibly more) SM cores, and one (or more) secure persistent memories. And as discussed in detail below, the SM-enabled IC optionally may include some other elements (e.g., one or more extractors, one or more Features, etc.), or some combination thereof. IC provider 105 can include a root-public key as a portion of the mask provided to IC manufacturer 110. IC provider 105 may obtain the root-public key from security service 120 who may act as a root authority.

The root authority is an entity that is associated with a root-authority system that manages SM programming capabilities, and can assign subsets of capabilities to one or more delegate-authority systems associated with one or more delegate authorities. As discussed in more detail below, the root-authority system may control configuration of an SM-enabled IC. Configuration of an SM-enabled IC may include, for example, performing Feature management of the SM-enabled IC, performing key management of the SM-enabled IC, or a combination thereof. The root-authority system may control Feature management of the SM-enabled ICs possessed by other entities in system 100. For example, the root-authority system may directly create cryptographically-verifiable (e.g., digitally signed) commands to lock, unlock, enable, disable, determine a value of, or configure Features associated with the SM-enabled ICs. Additionally, the root-authority system may create a limited authorization that allows configuration changes to SM-enabled ICs to be created by IC manufacturer 110, product vendor 125, device administrator 127, end-user 130, other entities, or some combination thereof.

The root-authority system may also control key management for the SM-enabled ICs. For example, the root-authority system may authorize the SM core to securely deliver payloads (e.g., secret keys, or other values) to other parts of the SM-enabled IC (including to software executing on the SM-enabled IC). The root-authority system may authorize one or more delegate-authority systems to securely deliver payloads.

As noted above, the root authority is an entity associated with the root authority system. Accordingly, while embodiments described herein may refer to security service 120 as the root authority, it is contemplated that other entities may act as the root authority. For example, IC provider 105, product vendor 125, or some other entity.

The previous paragraphs describe the root authority granting permissions to another entity. The recipient of these permissions is referred to as a delegate authority. In some instances a delegate authority is associated with a delegate-authority system that has been given a subset of the root-authority system's SM programming capabilities. The subset of SM programming capabilities may differ between delegate-authority systems. The delegate authority may be product vendor 125, IC manufacturer 110, device administrator 127, some other entity, or some combination thereof.

As discussed in detail below, the root-authority system, one or more delegate authority systems or some combination thereof, may have some (or full) control over modification (e.g., Feature and key management operations) of the SM-enabled ICs in system 100.

IC manufacturer 110 is an entity that manufactures ICs. As discussed above, some ICs are configurable, such that the chip may be configured for specific applications after manufacture. Systems on a chip ("SOC"), application specific integrated circuits (ASICs), FPGAs, mobile radio chips, and processors (e.g. CPUs), are examples of ICs suitable for use with embodiments described herein. In general, feature management is most particularly appropriate for chips that integrate multiple functions that can be used independently, or that have functions that are configurable, or have capabilities that should be enabled/disabled at different stages in the chip lifecycles (e.g., such as debug/test modes). And for key management applications, any chip that utilizes cryptographic keys or similar secrets may be a good candidate. IC manufacturer 110 may manufacture ICs that include an SM core. IC manufacturer 110 may embed one or more security keys, a device ID, initial Feature configuration settings, or some combination thereof, into the SM core as part of its manufacturing process, testing process, or both. To do this, IC manufacturer 110 is equipped to provide a first stage of customization which is discussed in detail below. Specifically, IC manufacturer 110 may be a delegate authority such that it is able to make specific configuration changes to SM-enabled ICs. For example, in an IC that contains multiple processors, IC manufacturer 110 may be allowed to set the number of processors usable in the SM-enabled IC, but not the clock rate for each processor. In some embodiments not shown, IC manufacturer 110 and IC provider 105 are the same entity.

Additionally, IC manufacturer 110 may conduct testing on the manufactured ICs to ensure they are operating within design specification. In some cases, testing processes such as wafer sort may be performed at a different facility and/or by a different company than IC fabrication, in which case the label "IC manufacturer 110" represents the combination of these roles/steps. IC manufacturer 110 provides the SM-enabled ICs to product vendor 125.

Product vendor 125 incorporates the SM-enabled ICs into one or more products (e.g., SM-enabled devices) which are then made available to end user 130. In some embodiments, product vendor 125 is a device or service retailer and makes the SM-enabled devices directly available to end user 130. In other embodiments, product vendor 125 distributes the SM-enabled devices to one or more third party device or service retailers (not shown) for distribution to end user 130.

Product vendor 125 may add additional customization of the SM-enabled ICs. To do this, product vendor 125 may be a delegate authority such that it is able to make certain specific configuration changes to SM-enabled ICs. For example, as a delegate authority, product vendor 125's delegate-authority system may be allowed certain capabilities by the root-authority system.

Even after a product is sold to end user 130, it is also possible to further configure or enable features in a SM-enabled IC. For example, end user 130 and/or the product, may coordinate with product vendor 125, device administrator 127, security service 120, a delegate authority, a root authority, or some combination thereof, to enable Features in a SM-enabled IC. For example, this process may involve transmitting a request over a network (e.g. by using a radio in the product to transmit a request message via a cellular data network) and receiving (e.g., by using a radio in the product to receive a message from a cellular data network) a chip-specific message that authorizes the requested configuration changes.

In some instances product vendor 125 may also act as an application author for one or more applications installed on a SM-enabled device. Additionally, product vendor 125 may acts as an application operator who administers functionality associated with the application. Similarly, product vendor 125 may also act as an operating system vendor, distributing an operating system compatible with the SM-enabled devices. Product vendor 125 may also act as a service operator (such as a mobile network operator), e.g. managing one or more services or capabilities that may be available to the SM-enabled device.

In other embodiments, other entities, one or more third parties (not shown), or some combination thereof, may be the application author, operating system vendor, application operator, or some combination thereof.

IP and/or security key provider 115 manages security keys for use with the SM-enabled IC. The security key values, including public keys and secret keys, may be provided to IC Manufacturer 110, security service 120, product vendor 125, device administrator 127, or some combination thereof. In some embodiments not shown, IP and/or security key provider 115 may also provide security keys to third party IP provider 107, IC provider 105, or some combination thereof.

Security service 120 may act as a central distributor for security keys which may be used by entities in the ecosystem. For example, security service 120 may obtain the security keys from IP and/or security key provider 115 (or from multiple security key providers) and distribute them to other entities in system 100. For example, a SM-enabled mobile telephone applications processor may be programmed with keys from a plurality of IP and/or security key providers 115, including many that operate independently and/or are not tied to a specific IC provider 105. Examples of such IP and/or security key providers 115 include without limitation electronic payment systems, DRM/anti-piracy systems, identity systems, etc. In some embodiments, security service 120 may include a root-authority system and acts as the root authority for the SM-enabled IC. In other embodiments the aggregation and root authority roles may be separate. As a root authority, security service 120 may authorize one or more other entities in system 100 to be delegate authorities, to for example, lock or unlock certain Features associated with SM-enabled ICs, securely deliver keys to parts of the SM-enabled IC (or to software executing on the SM-enabled IC) etc. As discussed in detail below, a delegate authority is authorized to make certain configuration changes to the SM-enabled ICs, subject to the privileges cryptographically granted by the root authority.

Billing and reporting service 122 may couple to some or all of the other entities within system 100. In some cases one or more entities in system 100 may wish to charge a fee for certain configuration settings to the SM-enabled ICs (e.g., to enable a value-added feature). Billing and reporting service 122 tracks fees associated with various transaction types by various entities in the ecosystem. For example, an entity may be required to pay to enable or disable Features associated with the SM-enabled IC(s) or deliver a key to the SM-enabled IC(s).

System 100 may include a third party IP provider 107 (or, as noted previously, several third party IP providers 107). A third party IP provider 107 may provide one or more Features or parts of Features to IC provider 105 for integration into the SM-enabled IC. Or in some instances, third party IP provider 107 may simply license IC provider 105 to use one or more existing Features or parts of Features. The integrated Feature may be enabled by the root authority or a delegate authority operating within its delegated capabilities. In some embodiments, the Feature is not enabled (e.g., unlocked) until third party IP provider 107 is compensated for the use of the IP block. For example, as discussed in the context of billing and reporting service 122, a delegate authority system may not be provided with the ability or authorization to authorize Feature activation until payment is received by billing and reporting service 122 and/or by third party IP provider 107.

End user 130 is an entity who uses the product (e.g., device containing the SM-enabled IC). End user 130 may, for example, purchase the SM-enabled device from IC Manufacturer 110, product vendor 125, device administrator 127, or some third party device or service retailer.

In some embodiments, system 100 includes device administrator 127. Device administrator 127 may be a delegate authority such that it is able to make specific configuration changes to SM-enabled ICs. End user 130 may then coordinate with device administrator 127 (or security service 120, etc.) to enable Features in a SM-enabled IC.

Additionally, in some embodiments the root authority may securely allow other entities in system 100 to enable or partially enable one or more Features of a SM-enabled IC or SM-enabled device for testing. For example, the root authority, via the root-authority system, may enable (or partially enable) a Feature in the SM-enabled IC for a set period of time or for a number of power-ups (e.g., such that the Feature is only enabled until the next time the SM-enabled IC is powered up or reset). Similarly, in some embodiments, the delegate, via the delegate-authority system, if permitted by the root authority, may also be allowed to enable or partially enable Features of the SM-enabled IC or device for testing.

Figure 1B:
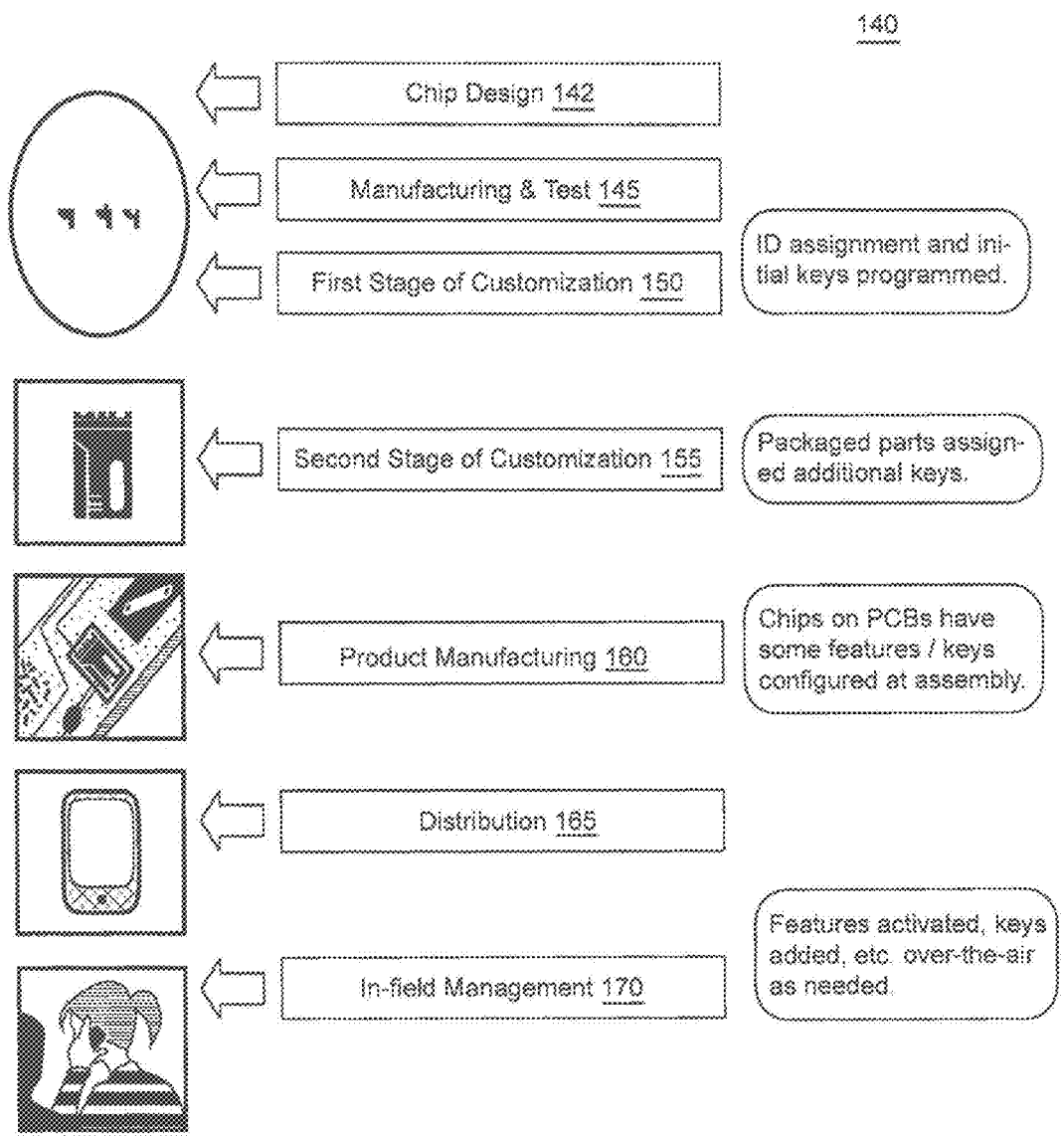
FIG. 1B is a flowchart which shows an example lifecycle for a Security-Manager-enabled device within an ecosystem.

Reference is now made to FIG. 1B, which shows an example lifecycle 140 for a SM-enabled device within an ecosystem (e.g., system 100). While the lifecycle discloses the following steps in a particular order, it is appreciated that at least some of the steps can be moved, modified, or deleted where appropriate.

In step 142, a SM-enabled IC is designed. As discussed in detail below, the design process may utilize, for example, a configurator, a netlist received from the SM vendor, and a means to generate hardware configuration keys and constants. For example, this generation process may involve the root authority system, e.g. in some embodiments the root authority system can generate a key pair for a public key cryptosystem, where the public key is exported as a hardware configuration key and the private key is retained in the root authority system (e.g., for authorizing delegates). The SM-enabled IC design may include one or more security keys that may be hardwired into the manufactured SM-enabled IC. The SM-enabled IC design may be configured to allow storage for one or more security keys that can be programmed into the manufactured SM-enabled IC (e.g., in steps 150, 155, or both).

In step 145, a SM-enabled IC is manufactured and tested based on the SM-enabled IC design. Each SM-enabled IC may have one or more SM cores, where each SM core may control one or more Features. As discussed in detail below, the Features may be read (e.g., to determine a value of a Feature), altered, enabled, disabled, or some combination thereof, as authorized by one or more security keys, via one or more SM commands, or some combination thereof. Additionally, in some embodiments, Features or parts of Features from third party providers (e.g., third party provider 107) may be incorporated into the SM-enabled IC. For example, a third party provider may provide a Feature used for rendering large image files at high speeds, but is not initially enabled. Testing may be conducted to confirm whether Features of the SM-enabled IC are operating correctly. For example, a delegate authority if permitted by the root authority (or the root authority itself) may temporarily (e.g., for a fixed time and/or until the chip is reset) enable one or more Features to facilitate testing. Depending on the embodiment, step 145 may be performed by IC manufacturer 110, IC provider 105, some other entity (e.g., a specialized testing facility), or some combination thereof.

In step 150, a first stage of customization occurs. In this step the SM-enabled IC may be assigned a device identifier ("ID") and configured with one or more keys from a root-authority system, a delegate-authority system, one or more keysplits, or base keys.

A keysplit is part of a key that, when combined with a different keysplit, forms a complete key (e.g., a base key). Keysplits may be used to increase security of the base keys, for example, by having the SM core in the SM-enabled IC programmed with different keysplits by different parties, none of which have knowledge of all the different keysplits. The combination of the keysplits, via a combining function, occurs within the SM core to provide the base key. Because none of the programming parties knows all the keysplits a compromise of a single facility does not necessarily compromise the base key.

An example configuration process is discussed in more detail below. Other parameters may also be set during the first stage of customization. For example, if the SM-enabled IC contains multiple processors, the first stage of customization may set the number of processors that may be initially used by product vendor 125. Or, for example, the first stage of customization may set a maximum clock rate for each processor to inhibit overheating of under load or to match maximum rates determined during testing 145. For example, storing such limits securely can prevent dishonest distributors from fraudulently remarking lower-speed parts as a higher speed grade. In alternate embodiments not shown, there is no step 150, and instead the first stage of customization is performed as part of step 155.

In step 155, a second stage of customization occurs. For example, the same series of SM-enabled ICs may be further configured to meet the requirements for different product vendors. In many instances, some product vendors may want SM-enabled ICs to be specially configured. During this stage of customization, the feature state of the SM core may be updated to customize the SM-enabled IC to each product vendor's needs. Updating the feature state may include disabling, enabling, or altering one or more Features associated with the SM-enabled IC, as well as loading additional keys, or some combination thereof. This second stage of customization may be performed, for example, by IC manufacturer 110, IC provider 105, product vendor 125, some other entity, or some combination thereof. Although cost concerns typically favor keeping the number of customization steps as small as possible, some applications may employ more or less than two stages of customization. Note that the two stages of customization (150 and 160) can, for example, be performed respectively at wafer-level test and package-level test of the IC.

In step 160, the SM-enabled IC is incorporated into a device to create a SM-enabled device during a product manufacturing process. The feature state of the SM-enabled IC may updated at this point as well. For example, a product vendor may enable combinations of Features to create different product lines of SM-enabled devices. This programming process can be secured using a hardware security module issued from security service 120 (e.g., to ensure that accurate records are ultimately provided to billing and reporting service 122). In this way, product vendor 125 may procure and hold in its inventory a single type of chip from IC provider 105, then this chip can be used in multiple products with different configurations that are set during product assembly. The Billing and reporting service 122 serves to ensure that the capabilities being enabled are paid for (e.g. so that the IC provider 105 is able to collect the appropriate amount for each chip depending on the chip's configuration). Keys may also be programmed into the SM core as part of step 160. For example, the product vendor may program a unique key in each SM-enabled device (such as a key known to product vendor 125 but not to IC provider 105).

In step 165, the SM-enabled device is distributed. The SM-enabled device may be distributed, for example, to another product vendor, a reseller, an end user 130, device administrator 127, or other entity in the ecosystem.

In step 170, in-field management of the SM-enabled device can be done. (A SM-enabled device that has left the product vendor is said to be in field. Note this is not necessarily synonymous with being in the hands of an end user, e.g., a mobile phone carrier operator may perform customization or provisioning of a phone before delivering it to end user 130.) In-field management can include a request being received to update the feature state of an SM-enabled device. For example, a request may be received to enable a special audio component of the SM-enabled IC. Such requests may be initiated, for example, by end user 130 or the device itself sending the request to the root authority or an appropriately authorized delegate authority. In-field management then involves transmission of one or more authorizations and/or secure keys to an SM-enabled device. As discussed in detail below, secure key delivery and feature management may be performed by the root authority, via the root-authority system in communication with the SM-enabled device, or by a delegate authority, via a delegate-authority system acting within its delegated SM-programming capabilities and in communication with the SM-enabled device. Upon receipt of the response, software in the SM-enabled device provides portions of the response (including cryptographic authorization from the root authority and/or delegate authority) to the SM core, which verifies that the authorization is valid for the particular device before performing the requested operation (e.g., Feature configuration, keying, etc.).

Any of the previous mentioned entities either acting alone or in conjunction with other entities may request, produce, cache, transmit, or modify the aforementioned update, management, and audit messages to control keys and Features of the SM-enabled device. Each of these entities with roles at various points of the device lifecycle may operate independently, and may have different degrees of ownership of the SM-enabled device or infrastructure interoperating with the device. The deployment of certain keys or features may involve payments, audits, or other business arrangements where the facilitation of SM-core activity, requests to perform certain actions, the process of formulating or interpreting SM-core messages, communicating or storing said messages, authorizing actions, may be performed by one or more of the aforementioned entities.

2. Security Manager System Architecture

Figure 2:
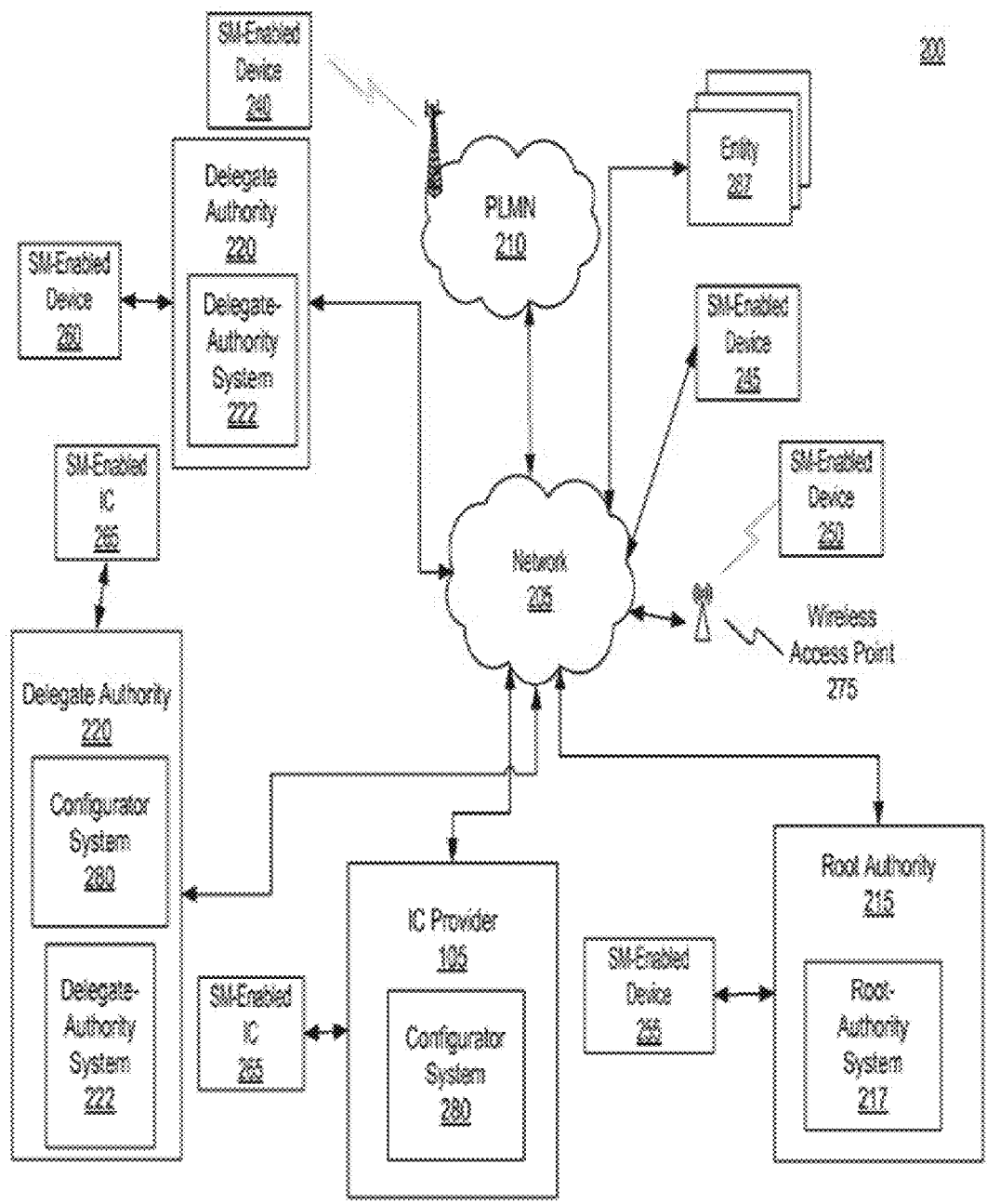
FIG. 2 depicts in block diagram form, an example operational system for configuring and managing one or more devices having Security-Manager-enabled chips.

Reference is now made to FIG. 2, which shows, in block diagram form, an example operational system 200 for configuring and managing one or more SM-enabled devices. System 200 can include some or all of a public land mobile network (PLMN) 210, a root authority 215, a root-authority system 217, a delegate authority 220, a delegate-authority system 222, an IC provider 105, SM-enabled devices 240, 245, 250, 255, and 260, SM-enabled ICs 265, a wireless access point 275, configurator systems 280, and additional entities 287, operatively connected by network 205.

Network 205 can be, for example, the Internet, an intranet, a local area network, a wide area network, a campus area network, a metropolitan area network, an extranet, a private extranet, any set of two or more coupled electronic devices, or a combination of any of these or other appropriate networks. Network 205 can also communicate with PLMN 210, which is also referred to as a wireless wide area network (WWAN) or, in some cases, a cellular network.

Root authority 215 is an entity (e.g., security service 120) that manages SM programming capabilities and can assign subsets of capabilities to one or more delegate authorities 220. Root authority 215 is associated with root-authority system 217 that contains (or otherwise has access to) the cryptographic keys that manage the SM-enabled ICs 265 and SM-enabled devices 240, 245, 250, 255, and 260. Root-authority system 217 is configured to generate one or more root-signed blocks ("RSBs"). As discussed in detail below, a RSB can include one or more SM commands, command templates, one or more delegate permissions, one or more keys (e.g., a delegate-public key), or some combination thereof. The RSB contains at least one digital certificate signed by root-authority system 217 using a root-private key (e.g., an RSA private key) that corresponds to a public key in the SM core. Root-authority system 217 may be configured to provide one or more RSBs or other data to configurator system 280, SM-enabled ICs 265, delegate-authority system 222, SM-enabled devices (e.g., 240, 245, 250, 255, or 260), one or more other entities 287, an electronic storage medium (not shown), or some combination thereof. Additionally, root-authority system 217 may be configured to provide the RSB when instructed by a user of root-authority system 217. Root-authority system 217 can be implemented on a single computer, or in some instances may be distributed across a plurality of computers (e.g., which contain key shares for a threshold signature system, where cooperation from multiple key shares is required to compute digital signatures) which may be geographically dispersed.

As discussed in detail below, root-authority system 217 may be configured to delegate privileges to one or more delegate-authority systems 222. Root-authority system 217 also may be configured to generate system and netlist key constants for one or more configurator systems 280. Additionally, root-authority system 217 may be configured to manage master keys which are used during the customization process (discussed below). Root authority system 217 may also be configured to create test vectors and other values to assist with SM core integration and ASIC manufacturing.

In some embodiments, root-authority system 217 may be configured to delegate the ability to create additional delegates. In this embodiment, a first delegate-authority system may be configured to create one or more second delegate-authority systems each of which have a subset of SM programming capabilities of the first delegate-authority system.

System 200 can include multiple delegate authorities 220. Delegate authority 220 is an entity that is associated with delegate-authority system 222. Delegate-authority system 222 has been given a subset of SM programming capabilities by the root-authority system 217. Examples of delegate authority 220 may, for example, include a product vendor 125, IC manufacturer 110, a device administrator 127, a service operator, a retailer, some other entity (e.g., as discussed with reference to FIG. 1A), or some combination thereof.

Delegate-authority system 222 may have certain capabilities (e.g., portions of key management operations, Feature management operations, or a both) delegated to it from root-authority system 217. These capabilities can be conveyed as a set of positive authorizations or as a set of restrictions. For example, privileges may be conveyed and limited by root-authority system 217, delegate-authority system 222, via control over what signed messages (e.g., signed blocks) are provided by authority systems, regulation of the signing key(s) used by the authority systems, regulation of the specific types of payloads that may be signed by one of the authority systems, regulation of the communications channel/destinations and the types of messages that may be conveyed to the SM-core, or some combination thereof. Example privileges that may be delegated include the ability to enable or disable certain hardware capabilities, adjust performance settings or other values, allow use of certain external interfaces, allow use of certain modes of operation, enable or disable test modes (e.g., control diagnostic and debug mode), control over when a particular mode or Feature is active (e.g., only active during the manufacturing process), the ability to adjust the values of certain configuration settings of Features of SM-enabled ICs, derive and/or use one or more key encrypting keys, encrypt keys for use by certain SM-enabled ICs, supply keys to IC subcomponents, adjust configuration of the SM-enabled IC generally, audit state information accessible by the SM core, program keys/keysplits, perform diagnostic activity on an in-field SM-enabled IC, calibrate or tune analog circuits to compensate for process variation, configure a PLL for the input clock and desired operating frequency in a specific product, adjust the power and frequency of a radio(s), configure the limits enforced by an internal thermal failsafe (thermal limits may vary based on the packaging and cooling solution used in different products), configuring a battery charging circuit, etc.

As noted previously, Feature settings are not limited to simple binary on/off settings. For example, there may be concerns (e.g., security, reliability, liability, etc.) that make it desirable to use delegate-authority system 222 or root-authority system 217 to require authorization for changes in configuration. For example, misconfiguring the PLL or using incorrect analog calibration may cause the SM-enabled IC to malfunction, so PLL settings can be secured by the SM core.

As discussed in detail below, delegate-authority system 222 is configured to generate one or more delegate-signed blocks ("DSBs"). Delegate-authority system 222 may be configured to provide a DSB to: configurator system 280, SM-enabled ICs 265, root-authority system 217, IC provider 105, SM-enabled devices (e.g., 240, 245, 250, 255, or 260), an electronic storage medium (not shown), one or more entities 287, or some combination thereof. Additionally, delegate-authority system 222 may be configured to provide the DSB when instructed by a user of delegate-authority system 222. The one or more entities 287 are entities who are not a delegate authority or a root authority, but may still receive RSBs, delegate-signed blocks ("DSBs"), or some combination thereof. For example, in some embodiments, device administrator 127, IP and/or security key provider 115, escrow service provider, etc., may not be a delegate authority, but may still receive RSBs, DSBs, or some combination thereof.

System 200 can include a number of SM-enabled devices, for example, SM-enabled devices 240, 245, 250, 255, and 260. SM-enabled devices 240, 245, 250, 255, and 260 can be, for example, smartphones, tablets, netbooks, desktop computers, set top boxes, mobile devices, laptop computers, digital video recorders, pay TV set top boxes, automobiles, manufacturing equipment, digital and video cameras, batteries, devices that authenticate peripherals, video game user interfaces and other user interfaces, etc. Although the example system of FIG. 2 is shown with multiple SM devices, the system may be implemented with one or any number of SM-enabled devices. SM-enabled devices 240, 245, 250, 255, and 260 verify signatures or other authorizations from root-authority system 217, which in turn can authorize, delegate-authority systems 222. Additionally, the coupling between an SM-enabled device (e.g., SM-enabled devices 240, 245, 250, 255, and 260) and root-authority system 217, delegate-authority systems 222, or both, may be temporary. For example, the coupling may exist for the time needed to modify operations of the SM-enabled IC. Authorizations for the SM-enabled device 260 and SM-enabled IC 265 may be created by root-authority system 217 or delegate-authority systems 222, and delivered via one or more device testers (not shown), programming fixtures (not shown), or other intermediates (not shown).

A device tester, in general, is configured to test the functionality of ICs. For SM-enabled ICs in particular, a device tester may additionally be configured to program information (e.g. keys, device ID, etc.) into the SM-enabled ICs (e.g., by supplying programming commands to the SM core). The device tester or programming fixture may also record information in a database about the device and its SM core, including device identifying information and configuration information. Each device tester may be configured to couple one or more SM-enabled devices to a root-authority system, a delegate-authority system, or both. Systems or devices that might have a range of features or capacities are ideally suited for the use of a SM-enabled IC.

A SM-enabled device may include one or more SM-enabled ICs (e.g., 265). Likewise, SM-enabled ICs 265 may include, for example, one or more SM cores, and one or more secure memories. And as discussed in detail below, the SM-enabled IC optionally may include some other elements (e.g., one or more extractors, outputs to control one or more Features, etc.), or some combination thereof. As discussed below, certain modifications may be made to SM-enabled IC 265 via key management or feature management operations.

SM-enabled devices 240, 245, 250, 255, and 260, even if comprising the ICs that were identical prior to programming, may be configured differently. In consumer electronics, similar silicon or IC's (e.g., fabricated from the same mask set) may be used in a wide range of products (for example, both high end and low end products), with the difference in performance controlled at least in part by configuration. A feature rich product might have, for example, advanced audio capabilities (e.g., surround sound), multiple HD video streams, a large number and varied of inputs and outputs, support for multiple cable providers including cable or satellite or wireless specific modems and transcoders, various tuners etc., viewing features such as, picture in a picture, Wi-Fi support etc. Likewise, a SM-enabled IC intended for use in a smartphone may include feature managed support for capabilities such as GPS, various wireless network radio protocols, Wi-Fi, near field communication based financial transactions, BLUETOOTH or other wireless peripheral interface, over the air video services, HD video support, wireless video interfaces, additional external video interfaces, numerous and various resolutions of cameras and sensors, support for various screen sizes and resolutions, processing for haptics, graphics, and video enhancement and acceleration. SM cores in SM-enabled ICs can be used to manage the size and performance of system resources such as, for example, the available or useable memory, or the speed and number of available processors. In some embodiments not shown, a SM-enabled device (e.g., 240, 245, 250, 255, and 260) may also be operatively coupled to configurator system 280. There can be many reasons why a particular Feature should be disabled on a particular chip, including to reduce IP licensing costs for unused features, to disable non-working or untested silicon areas, to avoid cannibalizing sales of higher-end parts, to disable modes/settings that may create security risks, etc.

Delegate authority 220 (e.g., IC provider 105 or IC manufacturer 110) may receive configuration data from configurator system 280. Data generated by configurator system 280 may inform delegate authority 220 how to address specific Features or keys. The configurator system 280 is discussed in greater detail below with reference to FIG. 4A.

Figure 3:
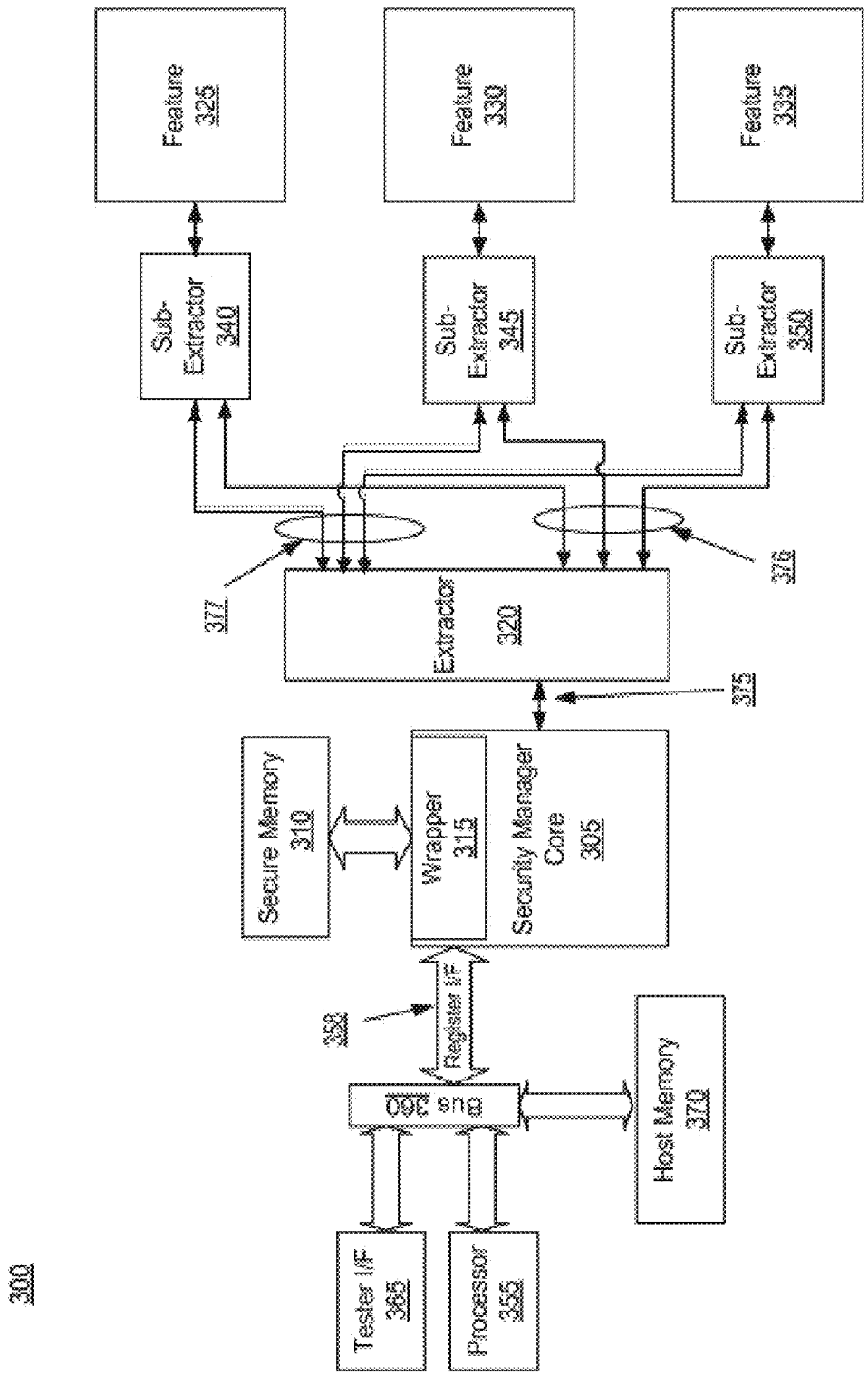
FIG. 3 is a block diagram of an example embodiment of a system including a Security-Manager-enabled IC for performing methods described herein.

FIG. 3 is a block diagram of an example embodiment of a system 300 including a SM core for performing methods described herein. System 300 may include a SM core 305, a secure memory 310, an extractor 320, a bus 360, a processor 355, an extractor interface 375, a key interface 376, a configuration value interface 377, a host memory 370, Features 325, 330, and 335, sub-extractors 340, 345, and 350, register interface 358, tester interface 365, or some combination thereof. The SM-enabled IC includes SM core 305 and secure memory 310, and optionally may include some (or all) of the other elements shown of SM system 300 (e.g., extractor 320, bus 360, processor 355, extractor interface 375, sub-extractors 340, 345, and 350, key interface 376, configuration value interface 377, a host memory 370, Features 325, 330, and 335, etc.). Although only one of each component is shown in FIG. 3, it should be understood that system 300 may comprise more than one of any of the named components. For example, system 300 may have multiple processors 355. Similarly, although the example system of FIG. 3 is shown with a single SM core 305, SM-enabled IC may contain multiple SM cores 305. Further, in some embodiments, system 300 may include tester interface ("I/F") 365 that may be operatively coupled (such as communicatively coupled using optical, electrical, or wireless transmission) to a tester. In some embodiments not shown, one or more sub-extractors 340, 345, and 350 may be combined with extractor 320.

Additionally, in some embodiments (not shown) SM core 305 may directly connect with one or more Features (not shown), and if all such connections are handled directly, extractor 320 and the sub-extractors may not be used. And in some embodiments, Features 325, 330, and 335 may continue to be connected using extractor 320, the one or more sub-extractors (e.g., 340, 345, and 350), and the interfaces (375, 376, 377).

Additionally, SM core 305 may directly read and write signals to other components of system 300. In some embodiments, SM core 305 may sample the system state, read data parameters, etc. via, for example, a dedicated interface (not shown) or via bus 360. For example, SM core 305 may issue read operations over bus 360 to obtain the desired information.

System 300 includes secure memory 310. Secure memory 310 can be a single secure memory and/or multiple homogenous or heterogeneous secure memories. Secure memory 310 may be a form of a digital memory where the setting of each bit may be fixed in a nonvolatile form. Secure memory 310 may include, for example, fuse memory, antifuse memory, one time programmable ("OTP") memory, erasable programmable read only memory ("EPROM"), electrically erasable programmable read only memory ("EEPROM"), RAM (including battery-backed RAM), or some combination thereof. In some embodiments, where secure memory 310 is fuse or anti-fuse memory, secure memory 310 may include redundant pathways that offer the ability to revise information previously stored in secure memory 310 (e.g., by overriding or remapping previously-written data). Depending on the technology and security features present, contents of secure memory 310 may be encrypted and/or authenticated, may be protected from reads by blocks other than SM core 305, may be configured to be one-time-programmable. Also, secure memory 310 may be isolated such that only SM core 305 is connected to secure memory 310, or such that other components of the SM-enabled IC may read from secure memory 310 but only SM core 305 may write to secure memory 310. Secure memory 310 may also be partitioned into one or more portions that may be read by components of the SM-enabled IC other than SM core 305 and one or more portions that may only be ready by SM core 305. SM core 305 may be directly responsible for performing all manufacturing test and programming operations for secure memory 310. Additionally, in some embodiments, secure memory 310 is designed to resist efforts to learn its contents by, for example, removing certain layers from the IC, capturing micrographs of the IC, or electrically probing the IC during operation. Additionally, in some embodiments, SM core 305 includes wrapper 315. Wrapper 315 translates requests from SM core 305 into requests understood by secure memory 310, and vice versa. In some embodiments, secure memory 310 may be integral to SM core 305.

System 300 includes one or more Features 325, 330, and 335. The inputs delivered via the sub-extractors 340, 345, 350 to Features 325, 330, and 335 are generally configurable, thereby providing configurability (e.g., via key management and Feature management operations) of the functionality associated with Features 325, 330, and 335. Such configuration changes may be performed by SM commands (described below) delivered to SM core 305 via register interface 358.

Features 325, 330, and 335 may include hardware, software, and combinations thereof. For example, Features 325, 330, and 335 may be a global positioning service, one or more processors (e.g., CPU, graphics processor, crypto core, etc.), additional memory, USB ports, video input or output ports, audio input or output ports, circuitry providing advanced graphics capabilities (e.g., picture-in-picture, multiple HD video streams, graphics acceleration, etc.), network transceivers for access to one or more networks (e.g., Wi-Fi, near field, BLUETOOTH, etc.), cameras, etc. The above listing of Features should not be considered limiting, as Features may include any component or capability that is configurable via key management or Feature management operations.

In some embodiments, a Feature or part of a Feature is provided by a third party IP provider. Features 325, 330, and 335 are associated with sub-extractors 340, 345, and 350, respectively. In some embodiments not shown, multiple Features may share a single sub-extractor. Sub-extractors 340, 345, and 350 facilitate the delivery of SM core outputs (such as configuration values and keys) across SM-enabled IC designs. Additionally, as discussed above, sub-extractors 340, 345, and 350 are optional, and are generally used for large or complex SM-enabled ICs (including those where top-level ASIC floor planning and/or routing are challenging) that include multiple Features. Extractor 320 is configured to deliver outputs from SM core 305 to sub-extractors 340, 345, and 350, which in turn deliver signals to Features 325, 330, and 335, respectively.

In one embodiment, the layout of the SM-enabled IC 300 is divided into multiple partitions. A partition may be a portion of a design of the IC, and represents how the IC is divided into blocks for design purposes. Each partition may include one or more sub-extractor associated with that partition. This enables independent development of each partition by different development teams or at different times, while keeping a feature bus interface of the sub-extractors as a constant. The physical partition may be easier to manage if the interface is kept constant (e.g., as a large single bundle of undifferentiated wires between the extractor and a particular sub-extractor). Placing the sub-extractors inside of the partitions may reduce exposure of the feature bus interface to naming churn (in which feature names associated with particular feature bits/wires are repeatedly changed).

In one embodiment, channel-based routing schemes may be implemented. For a channel-based routing scheme, a feature bus width (or sub-feature bus width), which represents a number of wires associated with the bus, is fixed. Thus, more wires than will be initially used will be pre-allocated for a sub-extractor. Such channel-based routing schemes are advantageous from a floor planning perspective, as the number of wires is allocated in advance, thus fixing a top-level floor plan. The ability to pre-allocate the routing from the extractor to the sub-extractors may provide efficiency improvements and minimize an amount of re-routing and/or a number of routing operations.

Example System 300 includes extractor 320. Extractor 320 is a hardware component that is configured to receive and route information (e.g., keys and feature state) from SM core 305 to the appropriate sub-extractor(s) associated with an intended destination Feature, in a form that is appropriate for the Feature. Feature state refers to information that has been processed by SM-core 305 and possibly extractor 320 such that it is in a form that is understandable by the destination Feature. Feature state may have one or more associated addresses in feature space. By way of example, the feature state may include enable signals, metadata, configuration or calibration information, or other data which is useful to Features.

In one embodiment, sub-extractors 340, 345, 350 use a synchronous sub-extractor clock. When configured to use a synchronous sub-extractor clock, each sub-extractor expects a clock (cmClk) input that is synchronous and skew balanced with the SM core's clock (cmClk). The extractor to sub-extractor interfaces in such an embodiment may be fully synchronous. This scheme may be used with a single clock, but may use a more complicated distribution network for that clock as opposed to use of other sub-extractor clock schemes.

In one embodiment, sub-extractors 340, 345, 350 use a forwarded sub-extractor clock, which is an alternative type of synchronous clock. When configured to use a forwarded sub-extractor clock, the extractor drives a copy of the clock (cmClk) input with each extractor to sub-extractor interface. The sub-extractors may use the received copy of the clock input to clock input flops for the interface. This source-synchronous interface structure significantly reduces a complexity of the distribution network for the clock to the sub-extractors. However, a delay may be introduced on the clock route from the extractor to the sub-extractor, which may be significant in some instances and may vary with operating conditions. Accordingly, in such an implementation, key logic in the sub-extractor may effectively become asynchronous with logic on any other clock of the IC 300, or an additional logic may be used in extractor to counterbalance the delay on the clock route.

A selection of the clock type may be made during generation of HDL modules for the extractor and sub-extractors, and may affect a final routing of one or both of the extractors and sub-extractors. For example, the clock type may affect the routing of a clock distribution network to the sub-extractors. Use of a clock type configuration parameter by a configurator may potentially simplify clock-tree planning and generation.

Extractor 320 is operatively coupled to SM core 305, and to one or more Features (e.g., Feature 325, Feature 330, and Feature 335). In some embodiments, extractor 320 is coupled to SM core 305 via an extractor interface 375 which may include a feature bus and/or a shared key bus. The feature bus may connect to a feature address space of the SM core 305, and the shared key bus may connect to a key interface of the SM core 305. Extractor interface 375 provides communication of information (such as feature data, security keys, and the like) from SM core 305 to extractor 320. Feature data may be secret or non-secret, and is general data that is used to configure a Feature. Extractor interface 375 may include wires which couple SM core 305 to extractor 320. Extractor 320 then transfers the information to the sub-extractor(s) associated with each destination Feature via key interface 376, configuration value interface 377, or a combination thereof.

Key interface 376 is a communication path configured to pass secret information (e.g., cryptographic keys, such as private keys to public key systems such as RSA and EC-DSA, symmetric keys to cryptosystems such as AES or triple DES, and keys for protocols such as HDCP or EMV). For example, extractor 320 may communicate a 128-bit key and target key address to one or more Features (e.g., 325, 330, and/or 350) via key interface 376. Key interface 376 may include one or more key buses. Extractor 320 may be configured to decode a target address to identify a particular sub-extractor associated with the destination feature. For example, sub-extractor 340, sub-extractor 345, and sub-extractor 350 are associated with Features 325, 330, and 335, respectively.

Configuration value interface 377 is a communication path configured to pass Feature data associated with Feature management operations. Configuration value interface 377 may include one or more sub-feature buses. For example, if one or more Features (e.g., 325, 330, 335, or some combination thereof) are being configured or enabled, extractor 320 passes the feature data to the appropriate sub-extractor via an appropriate sub-feature bus of configuration value interface 377. Likewise, if a particular Feature does not use (and/or for security reasons may not be permitted to receive) the values associated with given addresses, the extractor and/or sub-extractor can withhold these values from the destinations. Withholding unnecessary values can improve efficiency on ASICs by avoiding the unnecessary routing and delivery of values to sub-extractors or Features that do not need them. In some embodiments, extractor interface 375 provides bi-directional communication of information from SM core 305 to extractor 320. In other embodiments, extractor interface 375 provides one-way communication of information from SM core 305 to extractor 320. Key interface 376 and configuration value interface 377 may include wires which couple SM extractor 320 to one or more sub-extractors 240, 234, and 350.

Extractor interface 375, key interface 376, and configuration value interface 377, or some combination thereof, couple SM core 305 to extractor 320 and sub-extractors 340, 345, and 350. The combination of interfaces may transmit data from SM core 305 to an particular Feature by, for example, continuously sending data values, sending data when a change-of-value event occurs (e.g., enable Feature) or a request is received (e.g., because a Feature is powering on), or some combination thereof.

The current value of each element of the feature space associated with an SM core may be stored in, for example, secure memory 310, or SM private memories (discussed below). In some embodiments, a given operation (for example, processing of an RSB or DSB, discussed below) may update only a subset of the elements of the feature space. In embodiments where change-of-value events are communicated from SM core 305 to extractor 320, it is expected (although not required) that only the values of elements of feature space affected by a particular payload are communicated from SM core 305 to extractor 320 upon processing of that payload. In embodiments where all of the values in feature space are driven continuously from SM core 305 to extractor 320, the values affected by a particular payload may be combined with prior values of unaffected feature space from e.g. SM private memory for communication to extractor 320.

System 300 may include processor 355. Processor 355 can, for example, be a single or multiple microprocessors, field programmable gate array (FPGA) elements, or digital signal processors (DSPs). Specific examples of processor 355 are, for example, an x86 processor, an ARM processor, a MIPS microprocessor, an 8051 microcontroller, etc. Processor 355 may be coupled to SM core 305, host memory 370, tester I/F 365, or some combination thereof, via bus 360. In some embodiments, processor 355 may be configured to directly communicate with SM core 305, read and program secure memory 310 via SM core 305, retrieve SM core 305 status and system state, send commands to SM core 305, receive from SM core 305 cryptographic hashes of software (such as boot routines, operating system components, applications, etc.) authorized for execution by processor 355, or some combination thereof. Additionally, there may a plurality of processors performing these accesses. Additionally, in some embodiments, processor 355 has the capability to run higher privileged code, for example, in Ring 0, using ARM TrustZone®, or in a secure virtual machine monitor (SVMM). Lower-privileged processor 355 or process may be blocked using some or all capabilities of SM core 305. Register interface 358 may be used to communicate the identity and privilege level of the request, and SM core 305 can take the privilege level of the requestor into account when accepting and processing SM commands received across register interface 358.

System 300 may include host memory 370. Host memory 370 may be volatile (e.g., SRAM, DRAM, or other semiconductor memory) or non-volatile (e.g., hard disk, R/W optical disk, flash drive), or some combination thereof. Host memory 370 is operatively coupled to processor 355, SM core 305, tester I/F 365, or some combination thereof. In this embodiment, host memory 370 is coupled to one or more components of system 300 via bus 360.

System 300 may include tester I/F 365. Tester I/F 365 is an interface for tester system(s) (not shown). Tester I/F 365 may be, for example, configured to provide a communication path to SM core 305 when SM core 305 is in a manufacturing state, when the SM-enabled IC is in-field, when processor 355 is not yet operating (or is malfunctioning), or some combination thereof. Tester I/F 365 may be a scan interface, a test interface, joint test action group ("JTAG") interface, universal serial bus interface, advanced peripheral bus ("APB") interface, etc. A tester system may be coupled to system 300 such that it is able to test system 300 for correct operation. For example, the tester system can be configured to ensure that system 300 is properly enabling Features, disabling Features, programming secure memory 310, etc. The tester system may include one or more processors and a memory, and may communicate with (or include) a delegate authority system for authorizing operations in SM core 305.

System 300 includes SM core 305. SM core 305 may be operatively coupled to secure memory 310, extractor 320, and processor 355, host memory 370, and tester I/F 365 via register interface ("I/F") 358 and bus 360. Additionally, in some embodiments (not shown) SM core 305 may be directly connected to some or all of, processor 355, host memory 370, and tester I/F 365. SM core 305 includes one or more SM private memories (not shown). These one or more private memories may be used to store data used by the SM core, including one or more security keys (e.g., base keys, personalization keys, transport keys, netlist keys, root or delegate authority public keys, etc.), one or more pointers to locations within secure memory 310, instructions for wrapper 315, current configuration state associated with feature addresses, command processing intermediates, etc. In some embodiments, one or more security keys and a product chip ID may hard-wired into SM core 305 (e.g. root-authority public keys, base keys that must be available if secure memory 310 is malfunctioning or unconfigured, etc.). The one or more security keys may include symmetric keys, public asymmetric keys, private asymmetric keys, or some combination thereof. In some embodiments, the one or more security keys are specific to the SM core, and others may be shared among a series of SM cores. An SM core series refers to a set of SM cores which may be related in some way. For example, the SM cores in all of the SM-enabled ICs manufactured from a given mask design might be considered a series. Alternatively, all of the SM cores in any of a family of similar SM-enabled ICs might be considered a series.

In an example embodiment, SM core 305 is configured to receive one or more signed blocks, which may include a root-signed block ("RSB") as well as zero or more delegate signed blocks ("DSBs"). SM core 305 is configured to verify signatures associated with the signed blocks and extract an associated payload specifying restrictions/bindings (see below) as well as values (e.g., configuration settings or keys) intended for one or more Features (e.g., 325, 330, 335). Examples of restrictions include limitations on which SM cores should accept the payload (such as limitations designating a specific device ID, or required states for values stored in feature address space, or limitations on which features can be manipulated, etc.) SM core 305 may be configured to authenticate the payload using a public key of the root authority, and to extract (e.g., decrypt) the payload from the signed blocks using, for example, a private key built into the SM-enabled IC or derived from values stored in secure memory 210. SM core 305 is configured to distribute some or the results of processing the payload to the intended one or more Features (e.g., 325, 330, 335) via extractor 320.

In some embodiments, SM core 305 may be configured to execute instructions that update the Feature state of the SM-enabled IC, facilitate key delivery to Features, enable configuration of secure memory 310 (such as to configure parameters necessary for writing to the secure memory 310, if any), etc. For example, SM core 305 may be instructed to disable Feature 325 and enable Feature 330. Depending on the embodiment and the instructions provided, SM core 305 may make persistent changes (e.g., by updating secure memory 310), non-persistent changes (e.g., by updating the SM private memory), or both. Persistent changes are those which persist after the SM-enabled IC is powered down, such that the change persists after the IC enable chip re-boots. Non-persistent changes are those which last for a predetermined period of time or events. For example, a non-persistent change may only be good for a certain number of executions, until power is lost on the device, etc. SM core 305 may be configured for managing and delivering keys for secure digital ("SD") card encryption, flash memory/hard disk encryption, high-bandwidth digital content protection ("HDCP"), digital rights management ("DRM") systems, virtual private network(s) ("VPN"), payment instruments (e.g., EMV), password managers, radio link encryption, peripheral authentication, other secure operations, etc. Additionally, SM core 305 may be configured to receive one or more hardware ("HW") constants that may have been used in the IC configuration process.

SM core 305 may be configured to generate interrupts to processor 355. For example, SM core 305 may be configured to generate an interrupt when the feature state of the SM-enabled IC has been updated, when ready to receive additional I/O, when a key has been output, etc.

SM core 305 may be configured to execute one or more built in self checks. For example, SM core 305 may be configured to perform a self-check when first powered up, under the control of the test interface, etc.

In some embodiments, system 300 is a single IC (such as a system-on-chip) that combines all of the components shown in FIG. 3, or most of the components (such as everything except processor 355 and host memory 370).

3. Feature and Key Management

Feature management may be used to control whether, and in what ways, the configuration and other feature state of SM-enabled IC is updated. The feature state of the SM-enabled IC can control the capabilities of the SM-enabled device, for example, the ability to enable, disable, or otherwise securely configure operation of Features, ability to configure hardware capabilities based on product chip ID, to configure hardware capabilities based on geographic location of the SM-enabled IC, configure performance settings, allow or configure use of certain external interfaces, bypass use of certain modes of operation (e.g., enable/disable bug fixes modes that bypass certain functional modes of operation, patch ROM, adjust microcode, etc.), enable or disable test modes (e.g., control diagnostic and debug mode), control over when a particular mode or Feature is active (e.g., only active during the manufacturing process), the ability to adjust parameters used by Features, adjust configuration of the SM-enabled IC, perform audit operations to attest to the configuration or other information accessible to the SM core, securely perform diagnostic activity on an in-field devices, calibrate or tune analog circuits to compensate for process variation, set device configuration data (e.g., configuring a PLL for the input clock and desired operating frequency in a specific product), adjusting the power and frequency of radios based on regulatory requirements applicable for a specific product or region, configuring the limits enforced by an internal thermal failsafe (thermal limits may vary based on the packaging and cooling solution used in different products), configuring a battery charging circuit, enable latent capabilities or upgrades of the SM-enabled IC, disabling display of advertising messages on the SM-enabled device (e.g., by providing software with configuration status), enabling in-field upgrade to a higher operational performance of a CPU on the SM-enabled IC, etc.), etc. (or combinations thereof). For example, controlling diagnostic and debug mode may temporarily (e.g., until next reset) enable a debug Feature. Additionally, in some embodiments, whether or not the feature state is updated depends on whether a fee has been paid (e.g., as managed by billing and reporting service 122).

An example architecture of an SM core (and the SM-enabled IC) assumes that feature configuration settings are non-secret, but alteration of feature settings requires privileges (e.g. which originate from the root authority). For secret keys, it may be additionally required to protect the secrecy of the values, so secret values may be handled by using the key management functionality, discussed in more detail in the next section. Digital signatures may be used to ensure that the feature changes (as well as key-related operations) may be performed only by authorized parties.

Feature management may include recording feature changes in a non-volatile memory (e.g., secure memory 310), enabling feature changes that are active only until the next reset, enabling feature changes that are only valid for a fixed period of time (as measured by a clock cycle counter or a real-time clock), enabling select modes of operation (e.g., controlling diagnostic and debug mode, PLL configuration, etc.), or some combination thereof.

Key management functionality may be used to securely deliver payloads, for example secret keys or other values. Destinations may include software executing on the SM-enabled IC, hardware blocks, or even other parts of a device containing the SM-enabled IC. The SM-enabled IC contains several permanently-stored device-specific symmetric keys (the base keys). The base keys can be used to bootstrap the secure delivery of additional keys. After receiving a signed block containing a payload, the SM-enabled IC validates the signatures of the block(s) and any associated permissions before extracting the payload. Upon encountering a key management command, the SM-enabled IC conducts a key unwrapping process that first derives a transport key from a base key, then uses the transport key to decrypt a key contained in or referenced by the command, and finally passes the decrypted key to another hardware unit. As discussed above, with reference to FIG. 3, the decrypted key may, for example, be passed directly, or via an extractor, key interface (e.g., key bus), and sub-extractor to the hardware unit. Key management commands do not need to be run in a secure facility; payloads may be delivered in-field over untrusted communications channels to products containing SM-enabled ICs.

In one embodiment, the key unwrapping process uses a key tree construction that provides protections against side-channel and fault induction attacks. A key tree construction enables creation of multiple different keys from a single starting key, and each of the created keys may then successively be used to create multiple additional different keys. Alternate embodiments of the key unwrapping process may use, block ciphers (such as AES), asymmetric algorithms (e.g., RSA), etc.

4. Configurator and Compiler Functionality

A configurator system (e.g., configurator system 280) may be used during the design process of a SM-enabled IC. The configurator system is operated during the ASIC design process to track and automate the mapping of SM core managed feature space and keys to Features and other destinations or uses in the IC.

Figure 4A:
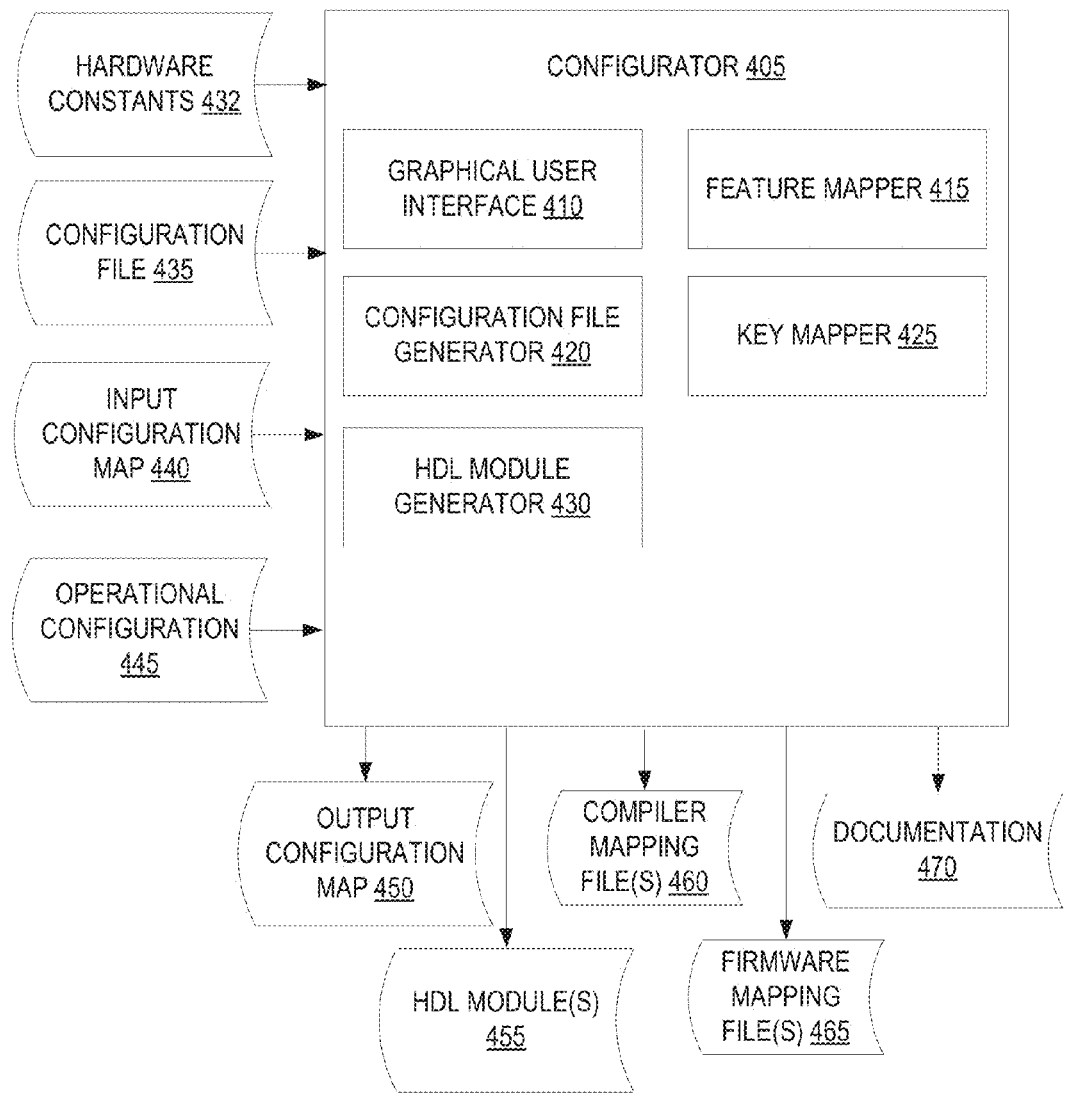
FIG. 4A is a block diagram of an example embodiment of a configurator.

FIG. 4A is a block diagram of an example embodiment of a configurator system (or simply configurator 405). In one embodiment, the configurator 405 is a software module (e.g., an application or program) that is executed by a processing device. The configurator may be programmed to run on various operating systems, such as Windows® operating system, Unix® operating systems, iOS® operating systems, Android® operating systems and Java® to name a few. The configurator 405 may also be configured as firmware, or as hardware, or as some combination of software, firmware and/or hardware. In one embodiment, the configurator 405 includes a graphical user interface (GUI) 410, a feature mapper 415, a configurator file generator 420, a key mapper 425 and a hardware description logic (HDL) module generator 430.

The configurator 405 may receive a configuration file 435 and hardware constants 432 as input. The input hardware constants 432 may include, for example, product chip IDs, one or more keys (such as an RSA or EC-DSA public key) from the root authority (potentially including a root authority public key), one or more keys from a delegate authority, one or more base keys, one or more additional security keys, error correction data, etc. The hardware constants may also include parameters for SM core 305 operation (e.g., memory usage, supported commands, etc.), error correction data, and other data. A product chip ID can uniquely identify a particular SM-enabled IC, or a particular SM-enabled IC series, or both, with an identification value. The security keys may be symmetric or asymmetric (and, if asymmetric, public or private). In some embodiments, the one or more base keys may be derived from a master key, an identification code of the SM-enabled IC series, a chip-specific identifier, or some combination thereof. Error correction data can include, for example, checksums related to one or more of the security keys. The hardware constants are usable to uniquely configure an SM-core for use in a particular IC.

The input configuration file 435 defines information about the desired configuration for a SM-enabled IC. The one or more configurator input files may define the particular configuration for a SM-enabled IC, list one or more security keys and their associated destinations on the SM-enabled IC, the names and addresses of Features managed by the SM core, etc. For example the one or more configurator input files may be configured to specify such things as named feature signals, configuration bits, grouping of configuration bits, security key bus outputs, security key bus attributes, secure memory mapping attributes, or some combination thereof. For example, the configuration file may specify such things as names and sizes (e.g., number of bits) for both keys and Features.

The configuration file 435 may include a separate feature name for each Feature that is provided by additional components of the SM-enabled IC. Additionally, the configuration file 435 may include a separate key name for each key that is to be used by components of the SM-enabled IC. Provided sizes for keys may correspond to standard key sizes, such as 128 bits for 128 bit keys and 256 bits for 256 bit keys. The provided sizes for Features may have any size, depending on a number of feature bits that will be used by a Feature. The configuration file may also include additional information, such as grouping or location of key names and feature names within feature address space, default (e.g., power-on) values for feature names and key names, names and attributes for security key bus destinations, security key bus attributes (such as key sizes for destinations), secure memory mapping attributes (such as information about the layout of secure memory 310), or some combination thereof. In one embodiment, the configuration file 435 provides definitions of sub-extractors. These definitions may include one or more of a sub-extractor name, feature names for Features to be routed by the sub-extractor, key names for keys to be routed by the sub-extractor, and so on.

Below is an example configuration file for a SM core, referred to in the configuration file as "cryptoManager". The example configuration file identifies a version number of the configuration file, a name, ASIC notes and a number of feature bits (e.g., 2048). The configuration file further includes data for a first Feature having the feature name CryptoEnables1 and a second Feature having the feature name CryptoEnables2. The CryptoEnables1 feature will have 2 bits. Feature address 0 is designated as the least significant bit of the feature address space to be used for the CryptoEnables1 Feature. The CryptoEnables1 feature will have a default value of 0, indicating that by default the Feature will be disabled.

The CryptoEnables2 Feature will have 32 bits. No default value and no particular bits of the feature address space are defined for the CryptoEnables2 Feature. Accordingly, these values will be automatically assigned for this Feature by the configurator 405.

The example configuration file additionally includes data for a first key having the key name CryptoKey1 and a second key having the key name CryptoKey2. CryptoKey1 will be a 128 bit key, and will be assigned to key index 1 (e.g., for connection to a key bus 1) of the security manager core's key interface. CryptoKey2 will be a 256 key. CryptoKey2 does not designate a particular key index, and so a key index will be automatically selected for CryptoKey2 by the configurator 405.

The example configuration file additionally includes data for two specified sub-extractors. A first specified sub-extractor has a name of SpecialDevice1, and includes CryptoKey1 and CryptoEnables1. A second specified sub-extractor has the name SpecialDevice2, and includes CryptoEnables2.

```
cryptoManager:
{
    version = 1;
    name = "cmExtractor";
    asicNotes = "Demonstration top level extractor";
```

-continued

```
    featureBits = 2048;
    features = (  {
                    name = "CryptoEnables1";
                    asicNotes = "Fuses to enable Crypto Accelerator #1";
                    bits = 2;
                    featureLsb = 0;
                    default = 0;
                },
                {
                    name = "CryptoEnables2";
                    bits = 32;
                } );
    keys = (    {
                    name = "CryptoKey1";
                    asicNotes = "Key for Cryptographic Accelerator #1";
                    bits = 128;
                    keyIndex = 1;
                },
                {
                    name = "CryptoKey2";
                    asicNotes = "Key for Cryptographic Accelerator #2";
                    bits = 256;
                } );
    sub-extractors = ( {
                    name = "SpecialDevice1";
                    asicNotes = "Special Device Features";
                    features = ( { name = "CryptoEnables1"; } )
                    keys = (     { name = "CryptoKey1"; } );
                {
                    name = "SpecialDevice2";
                    features = ( { name = "CryptoEnables2"; } )
                );
            } );
};
```

Feature mapper 415 may use the data associated with Features from the configuration file to map a feature address space of the security manager core to features of additional components on the IC. This may include determining a number of bits to be used for the feature names, identifying available bits in the feature address space, and mapping the feature names to identified available feature bits. The allocated feature bits may be wires that will connect security manager core to an additional component of the IC. The feature mapper 415 may additionally allocate feature bits as wires that will carry data used internally to change behavior of the security manager core. Feature mapper may also assign default values to the assigned bits of the feature address space.

Figure 4B:
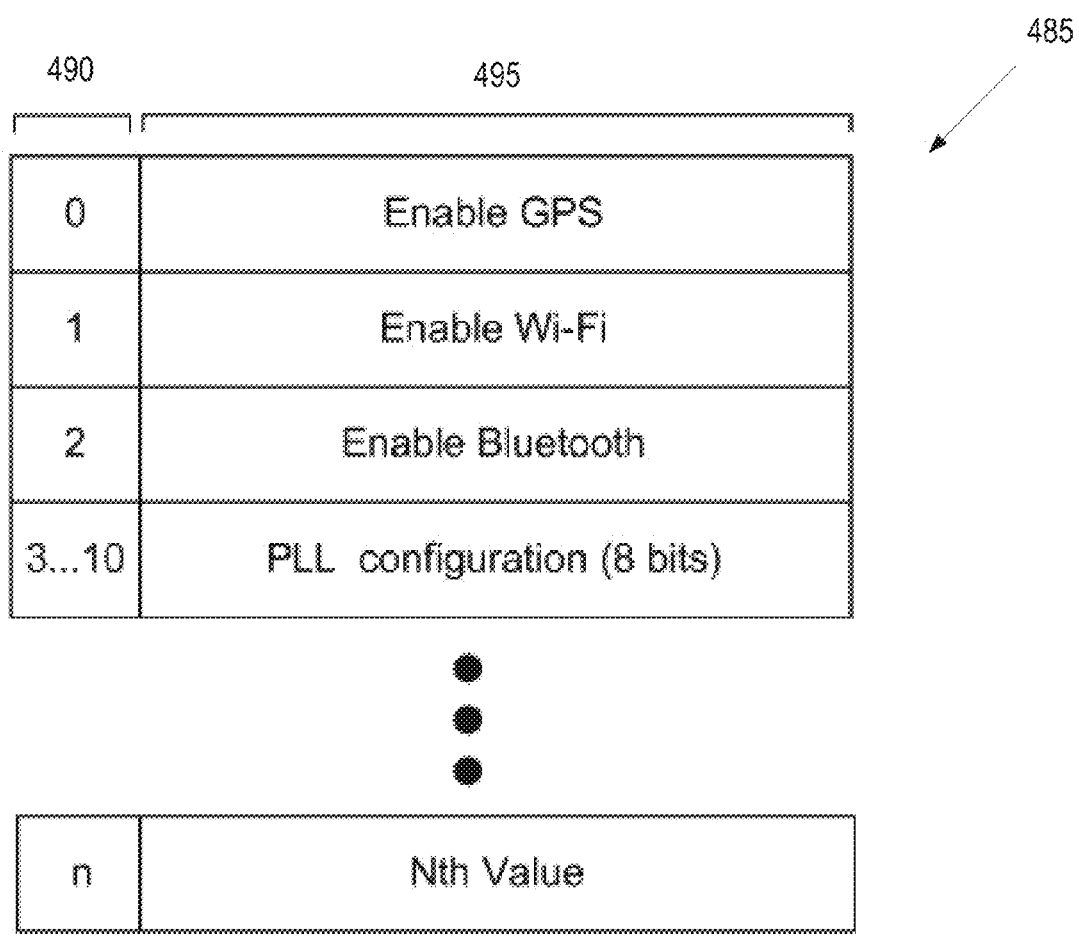
FIG. 4B is a block diagram of an example embodiment of a feature space associated with a Security-Manager-enabled IC.

In an example embodiment, the SM core feature space is an address space stored in a memory that includes values controlling specific functionality or configuration aspects of an SM-enabled IC. FIG. 4B is a block diagram of an example embodiment of a feature space 485 associated with a SM enabled IC. Feature space 485 includes one or more values 495, each of which has an associated address 490. For example, the value "GPS radio enabled" might be assigned to address 0 in feature space. Other values in the feature address space, such as a multi-bit PLL configuration value, may span multiple bits (and the corresponding addresses).

In some embodiments, one or more of the values in feature space 485 may relate to the SM core itself rather than other Features of the SM-enabled IC. Such feature space values are known as internal features. For example, an internal feature might control whether a certain base key is available for use, carry information about a device (such as the identity of the product manufacturer, the geographical region where the product was sold), etc. These internal features can be used to control authorizations (e.g., so that an authorization intended for devices in one geographical region will not work on devices in another).

Internal features are addressable and are controlled in a manner similar to features used to control device elements. Internal features may be used to represent a higher level privilege or feature condition, which is then mapped to more specific SM core outputs that direct elements of the device. For example, an internal feature may represent a numerical speed grade from 1 to 7, while the SM core outputs include control signals for setting a larger number of PLL clock control settings that map to the speed grade. In this way, as will be described later, the numerical speed grade setting can be used as a condition for forming SM core commands whose operation is limited to specific speed grades. In another example, internal features can be used within the SM core to track an issued group identifier, device identifiers, or the fact that a device has been packaged, manufactured, or sold by a certain identity. In this example, the manufacturing entity could be a delegate authority 220 with the permission to program its manufacturer ID into an internal feature. SM-core commands can interpret the internal features and use the results to control how the SM core manages other features or keys. For example, the SM core may only output certain keys or permit certain debug settings for devices operated by a specific network operator or only for devices in a pre-retail state.

Referring back to FIG. 4A, in an example, feature mapper 415 may use the provided information for CryptoEnables1 from the example configuration file to map a feature name of CryptoEnables1 to bits 0-1 of the feature address space, and may assign default values of 0 to those bits. Feature mapper 415 may additionally use the provided information for CryptoEnables2 to map a feature name of CryptoEnables2 to bits 2-33 of the feature address space.

Key mapper 425 may use the data associated with keys from the configuration file to map a key interface of the security manager core to the additional components of the IC. The configurator 405 may be utilized both during and after chip development to manage these settings and configurations. Mapping key names to the key interface may include identifying a key size associated with the key name (e.g., 128 bits, 256 bits, 512 bits, etc.), identifying an available key index having the key size, and assigning the key name to the identified key index. For example, key mapper 425 may use the provided information for Crypto-Key1 from the example configuration file to map a key name of CryptoKey1 to key index 1 (which is a 128 bit key index) of the key interface. Additionally, key mapper 425 may use the provided information for CryptoKey2 from the example configuration file to map a key name of CryptoKey2 to key index 2 (which is a 256 bit key index) of the key interface.

HDL module generator 430 uses the mappings generated by the feature mapper 415 and the key mapper 425 to generate one or more hardware description language modules 455. The HDL modules may be Verilog modules, or other hardware description language modules describing components of the SM-enabled IC. The extractor hardware definition and any sub-extractor hardware definitions may be used to produce the SM-enabled IC design containing an extractor and sub-extractors.

The HDL modules 455 in one embodiment include an extractor HDL module and at least one sub-extractor HDL module. The extractor HDL module may define an extractor, where an input for the extractor may be connected to the feature address space via a feature bus and to the key interface of the SM core via a shared key interface. A shared key interface may also connect the extractor to a sub-extractor, and may be shared for all key buses assigned to the sub-extractor. An output of the extractor defined by the extractor HDL module may be connected to one or more sub-extractors via the shared key interface and via sub-feature buses.

The sub-extractor HDL modules may be generated based on the determined mappings and/or based on sub-extractor information provided in the configuration file. For example, once feature bits of the feature address space are mapped to feature names and key indexes are mapped to key names, this mapping information may be combined with provided sub-extractor data to generate a sub-extractor HDL module. This may include generating sub-feature buses for feature bits that will be connected to the sub-extractor. The sub-extractor may be configured to have an input of a subfeature bus and outputs of individual feature bits. Additionally, the sub-extractor may have a shared key interface input that connects to the extractor and individual key bus outputs.

In an example, HDL module generator 430 may use the provided information for the sub-extractor named Special-Device1 from the example configuration file to generate a SpecialDevice1 sub-extractor. This may include mapping a subfeature bus including bits 0-1 of the feature address space to the SpecialDevice1 sub-extractor's input and mapping individual bits for feature bits 0-1 to the sub-extractor's output. HDM module generator 430 may additionally map an input of the SpecialDevice1 sub-extractor to a shared key interface associated with key index 1 and an output of the SpecialDevice1 sub-extractor to a particular 128 bit key bus.

Similarly, HDL module generator 430 may use the provided information for the sub-extractor named SpecialDevice2 from the example configuration file to generate a SpecialDevice2 sub-extractor. This may include mapping a subfeature bus including bits 2-33 of the feature address space to the SpecialDevice2 sub-extractor's input and mapping individual bits for feature bits 2-33 to the sub-extractor's output. HDM module generator 430 may additionally map an input of the SpecialDevice1 sub-extractor to a shared key interface associated with key index 2 and an output of the SpecialDevice2 sub-extractor to a particular 256 bit key bus. Accordingly, the extractor HDL module defines an extractor configured to route appropriate portions of the feature bus to each sub-extractor.

In one embodiment, sub-extractors may be nested. Accordingly, the output of a first sub-extractor may connect to the inputs of a second nested sub-extractor and a third nested sub-extractor. The first sub-extractor may receive as an input a particular sub-feature bus, and may provide as output smaller buses that are subsets of the sub-feature bus. If, for example, the first sub-extractor was to connect to two additional sub-extractors, it may divide a sub-feature bus into two subset buses. The sub-extractor may then connect a first subset bus to the second sub-extractor and the second subset bus to the third sub-extractor.

The extractor and sub-extractor module(s) generated by the configurator allow for independent development of different physical partitions of an IC (e.g., of a SoC), while keeping the feature bus interface to the sub-extractor constant. Designing the IC and each physical partition may be easier to manage if the interface is kept constant (i.e. a single bundle of undifferentiated wires between extractor and sub-extractor). Each partition of the IC can be assigned to a different design team, for example. If a partition is in communication with the SM core, a sub-extractor module (as generated by the configurator) can be placed inside its designated partition during layout of the IC to simplify place and route, for example.

The use of the extractor and sub-extractor also is advantageous from a floor planning perspective. A number of wires in the feature bus and in sub-feature buses may be allocated in advance to fix a top-level floor plan. The ability to pre-allocate the routing from extractor to sub-extractor may reduce a number of routing operations that are performed during IC design, and may ultimately cause the routing to be less complex.

The output HDL modules 455 may be used by layout tools such as Synopsys® DesignCompiler, Cadence RTL Compiler®, etc. to convert register transfer level (RTL) design data from the HDL modules 455 into gates or other logics (e.g., into a gate list). The HDL modules 455 may additionally be converted into multiplexers (MUXes) or other custom logic for the IC. In one embodiment, the configurator 405 handles the conversion of assign statements (which attach wires to other wires) in the HDL modules into logic such as gates, MUXes, and so forth.

Configuration file generator 420 generates an output configuration map 450 based on a result of the mapping performed by the feature mapper 415 and the key mapper 425. The configuration map 450 includes mappings of feature names to the feature address space and of key names to the key interface. In some embodiments, the output configuration map 450 may also define the routing or mapping between the feature address space of the security manager core and an extractor, sub-extractors, and/or one or more additional components. The output configuration map 450 may also define the routing or mapping between a key interface of the security manager core and the extractor, the sub-extractor and/or the one or more additional components. The output configuration map 450 may contain some of the same mapping information as is represented by the extractor HDL module and sub-extractor HDL modules, but may have an entirely different format. The output configuration map 450 may later be input back into configurator 405 alone or along with additional configuration files to update the key mapping and feature mapping, and to generate updated HDL modules.

Provided below is an example output configuration map that has been generated by a configurator using the above example input configuration file. In one embodiment, the output configuration map has a similar format to the input configuration file. However, in the output configuration map, all optional fields such as allocated bits from the feature address space, default values, allocated key index, and so on are populated with data. Additionally, a feature list, key list and sub-extractor list may each be sorted in alphabetical order in the output configuration map. A design version may also be incremented in the configuration map.

```
cryptoManager:
{
    version = 1;
    designVersion = 1;
    name = "cmExtractor";
    asicNotes = "Demonstration top level extractor";
    featureBits = 2048;
    features = (    {
                    name = "CryptoEnables1";
                    asicNotes = "Fuses to enable Crypto Accelerator #1";
                    bits = 2;
                    featureLsb = 0;
                    default = 0;
                },
                {
                    name = "CryptoEnables2";
                    asicNotes = "";
                    bits = 32;
                    featureLsb = 2;
                    default = 0;
                } );
    keys = (    {
                    name = "CryptoKey1";
                    asicNotes = "Key for Cryptographic Accelerator #1";
                    bits = 128;
                    keyIndex = 1;
                },
                {
                    name = "CryptoKey2";
                    asicNotes = "Key for Cryptographic Accelerator #2";
                    bits = 256;
                    keyIndex = 2;
                } );
    sub-extractors = (  {
                    name = "SpecialDevice1";
                    asicNotes = "Special Device Features";
                    features = ( { name = "CryptoEnables1"; }
                    );
                    keys = (    { name = "CryptoKey1"; } );
                },
                {
                    name = "SpecialDevice2";
                    asicNotes = "";
                    features = ( { name = "CryptoEnables2"; }
                    );
                } );
};
```

During the IC design process, multiple versions of the IC may be created. To facilitate and simplify this design process, the output configuration map 450 may be provided to configurator 405 as an input configuration map 440. The input configuration map 440 may be input into the configurator 405 along with an updated or new configuration file. Alternatively, the input configuration map may have been manually altered by a user, and may be input without an accompanying new configuration file. In either case, configurator 405 may update the mapping, generate a new output configuration map, and/or generate new HDL modules based on the new configuration file and/or the input configuration map.

In one embodiment, configurator 405 utilizes a state cache that tracks changes in the configuration map, and which may be used to minimize modification of an existing circuit design layout. A state cache may be, for example, a map file, the configuration map, etc. In some embodiments, instead of utilizing a map file to update the state cache, configurator 405 is configured to re-read a prior output to implement the state cache.

After a design of an IC is complete, the output configuration map 450 may be provided to configurator 405 along with an operational configuration 445. The operational configuration 445 may include, for example, features for internal use by the SM core. These internal features may be named without affecting existing wiring. For example if unused bits are left in the feature bus, these unused bits can be named as internal features without affecting existing wiring between the SM core, extractor, and sub-extractors. Below is an example operational configuration. It can be the existing configuration, plus a named feature "InternalFeature" added for internal use only.

```
cryptoManager:
{
    version = 1;
    name = "cmExtractor";
    asicNotes = "Demonstration top level extractor";
    featureBits = 2048;
    features = (  {
                    name = "CryptoEnables1";
                    asicNotes = "Fuses to enable Crypto Accelerator
                        #1";
                    bits = 2;
                    featureLsb = 0;
                    default = 0;
                },
                {
                    name = "CryptoEnables2";
                    bits = 32;
                },
                {
                    name = "InternalFeature";
                    asicNotes="internal use by core only";
                    bits = 1;
                    featureLsb=2047;
                } );
    keys = (    {
                    name = "CryptoKey1";
                    asicNotes = "Key for Cryptographic Accelerator
                        #1";
                    bits = 128;
                    keyIndex = 1;
                },
                {
                    name = "CryptoKey2";
                    asicNotes = "Key for Cryptographic Accelerator
                        #2";
                    bits = 256;
                } );
    sub-extractors = (  {
                    name = "SpecialDevice1";
                    asicNotes = "Special Device Features";
                    features = ( { name = "CryptoEnables1"; });
                    keys = (     { name = "CryptoKey1"; } );
                {
                    name = "SpecialDevice2";
                    features = ( { name = "CryptoEnables2"; });
                } );
};
```

Configuration file generator 420 may use the input configuration map 440 and the operational configuration 445 to generate compiler mapping files 460, firmware mapping files 465 and/or documentation 470. Compiler mapping files 460 (also referred to as command mapping files) are, for example, files used to map commands into a form understandable by an SM-enabled IC. Such commands may include commands to enable a Feature, disable a Feature, determine a value of a Feature, and so forth. Thus, compiler mapping files 460 may be used to develop a device driver specific to a particular configuration of a SM core. A compiler may use the compiler mapping files 460 to convert a high level description into a compressed byte stream that the SM core can execute.

Firmware mapping files 465 are files that contain defines and structures needed for software development (e.g., header and source file, definitions used for software development, etc.). Firmware mapping files can deliver the mappings for the feature space and key interface to software engineers to enable them to code command sequences that will be used by the SM core to enable and disable Features and to deliver keys. Accordingly, the software engineers may write commands referencing the feature using feature names without having any knowledge of actual feature bits or wires that will be used.

Documentation 470 provides an overview of the SM-enabled IC design, such as list(s) of assigned names in feature space and the associated addresses, list(s) of which configuration values are sent to each feature, information about supported keys, default values for values in feature address space, etc. Additionally, documentation 470 can include environment and construction principles used in design of software components. The documentation 470 may be one or more files output in formats such as XML, HTML, text, PDF, WORD, etc.

Figure 5:
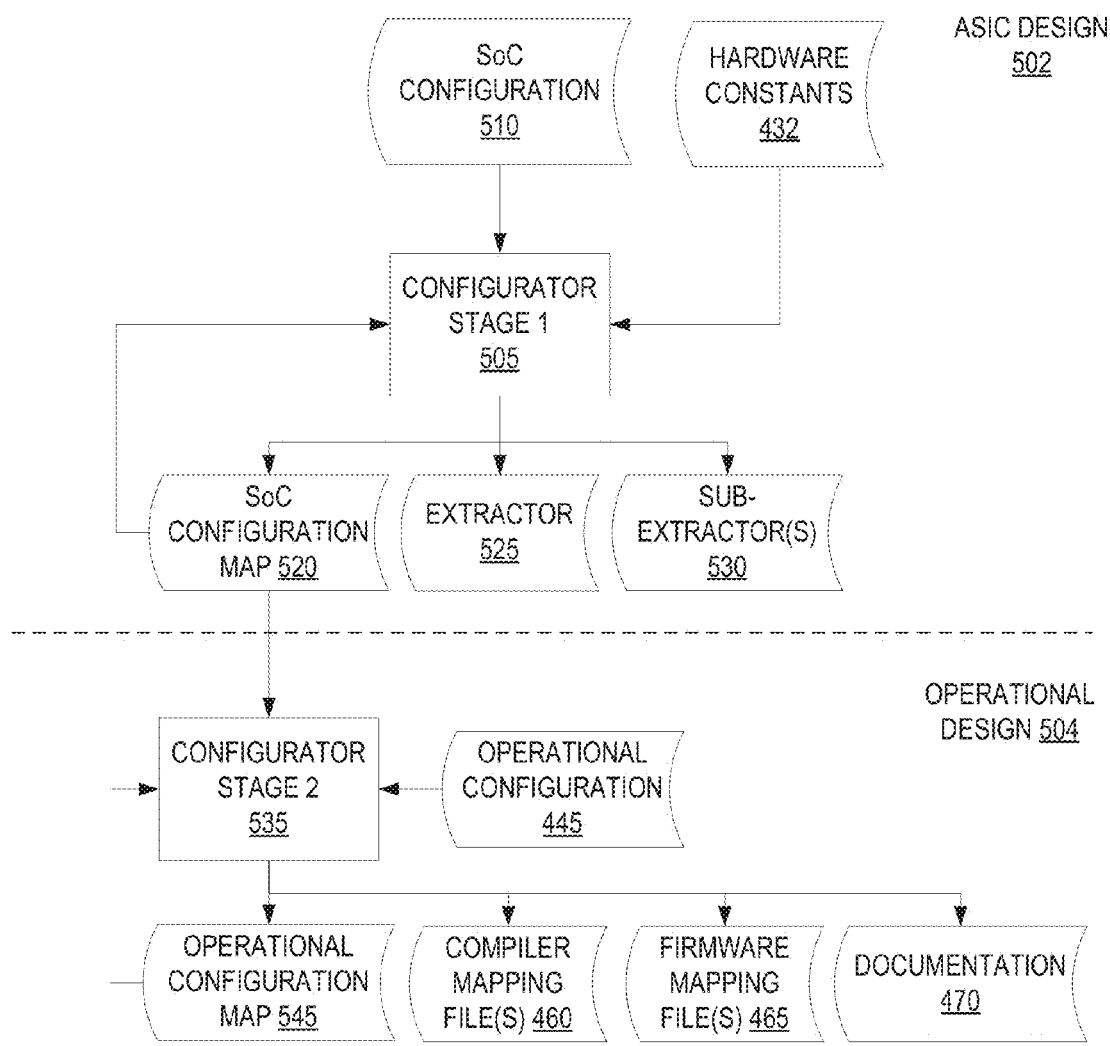
FIG. 5 is a chart showing inputs and outputs of a configurator during an ASIC design phase and during an operational design phase for an integrated circuit.

FIG. 5 is a chart showing inputs and outputs of a configurator during an ASIC (or other IC type) design phase and during an operational design phase for an integrated circuit. During an ASIC design phase, the configurator (labeled configurator stage 1, having reference 505) receives a system-on-chip (SoC) configuration (which may correspond to configuration file 435) and hardware constants 432. Based on the SoC configuration 510 and the hardware constants 432, the configurator stage 1 outputs an HDL module for an extractor 525 and one or more HDL modules for sub-extractors 530. The configurator stage 1 further outputs a SoC configuration map, which may correspond to output configuration map 450.

During design of an integrated circuit, multiple iterations of the IC may be generated. For any subsequent design iteration, the SoC configuration map 520 may be input back into configurator stage 1 along with a new SoC configuration and/or new hardware constants. Configurator stage 1 may then output a new extractor 525 HDL module, new sub-extractor HDL modules 530 and a new SoC configuration map 520.

After the design of the IC is finalized, engineers may program instructions for the IC. Additionally, engineers may create a device driver for the security manager core of the IC. To facilitate such development of the instructions and the device driver, the configurator (labeled as configurator stage 2) is used during an operational design phase 504. The configurator stage 2 (having reference #535) receives the finalized SoC configuration map 520 along with an operational configuration 445. Based on this information, the configurator outputs an operational configuration map 545. The operational configuration map 545 contains all of the information of the SoC configuration map 520 along with operational information. The configurator stage 2 additionally outputs compiler mapping files 460 and firmware mapping files 465. Additionally, the configurator stage 2 may output documentation 470 showing the operational configuration map.

FIGS. 6A-10 are flow diagrams showing various methods of operations performed by a configurator. The methods may be performed by a computing device that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing a configurator, such as configurator 405 of FIG. 4.

Figure 6A:
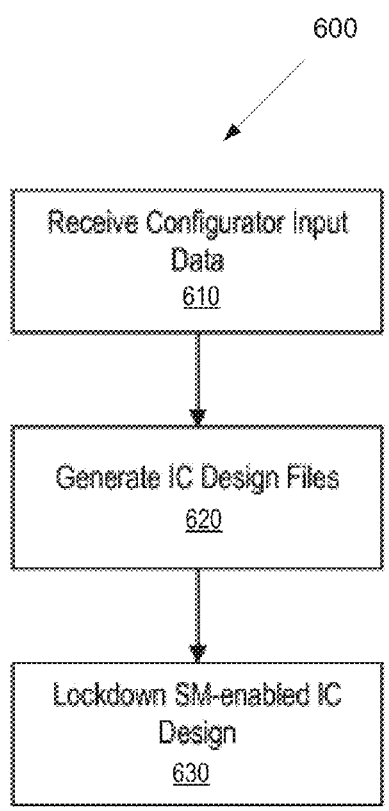
FIG. 6A is a flow chart of an example method for utilizing a configurator system during the design process of a Security-Manager-enabled IC.

FIG. 6A is a flow chart of an example method 600 for utilizing a configurator system during the design process of an SM-enabled IC. At block 610 of method 600, the configurator system receives configurator input data. Configurator input data may include one or more configurator input files, hardware ("HW") constants, or some combination thereof.

At block 620, the configurator system generates IC design files. These IC design files may include an extractor hardware definition(s), sub-extractor hardware definition(s), and state cache data (e.g., IC configuration map information). In some embodiments, prior IC configuration map information may be included with the configurator input data at block 610 to minimize modification of the existing circuit design layout when incorporating changes to the SM-enabled IC design. In this case, the configurator seeks to identify the least-impactful way to make a requested change. For example, if a new value is to be inserted into the feature address space, this may include using the previous map to identify a previously-unused location for the insertion (e.g., as opposed to re-creating the locations for existing values). Likewise, if a value is removed from the feature address space, the configurator may use the previous map information to leave a gap as opposed to relocating remaining features.

The chip design is locked down (block 630), e.g. as the chip design is prepared for large-scale manufacturing. At this point, configurator outputs that affect the mask sets used in manufacturing may no longer be changed.

Figure 6B:
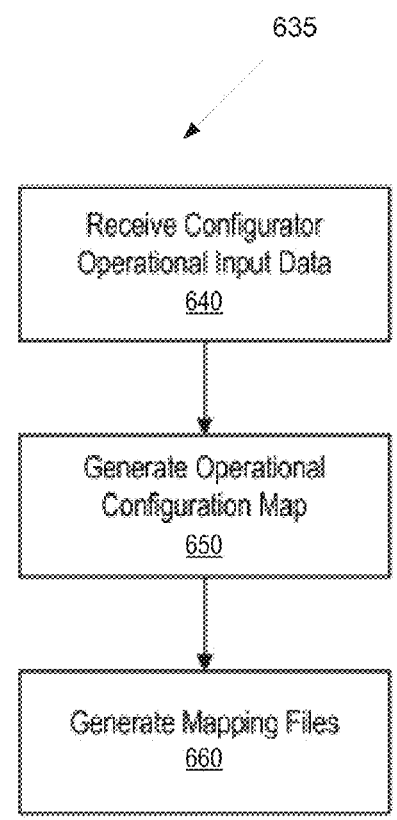
FIG. 6B is a flow chart of an example method for utilizing a configurator system after chip development.

FIG. 6B is a flow chart of an example method 635 for how the configurator may be utilized after the chip design is committed for manufacturing. At block 640 of method 635, the configurator system receives configurator operational input data. Configurator operational input data may include the IC configuration map generated by method 600 as well as additional data (e.g., in an operational SM configuration file). The operational SM configuration file may describe, for example, policies about how features and keys associated with a particular SM-enabled IC may be used, changes to naming conventions, layout and configuration conventions for the SM core's use of secure memory 310, and mapping of internal features to feature addresses.

At block 650, the configurator system internally generates the operational configuration map. Because operations of method 635 can be performed later than those of method 600, the map generated at block 650 can be a more comprehensive and up-to-date mapping of feature address ranges than could be prepared during method 600, but the process 635 generally assumes that outputs from method 600 that actually affect the chip hardware will not be changed.

At block 660, the configurator system generates mapping files from its operational configuration map. These mapping files include one or more command mapping files and one or more firmware mapping files. Command mapping files are, for example, files used to map commands into a form understandable by an SM core. For example, if the root authority system wishes to convey a particular configuration value to a given Feature, this file can help the root authority system identify the feature space address corresponding to that configuration value and Feature. Firmware mapping files are files that contains defines and structures needed for software development (e.g., C or C++ header and source file, etc.). In some embodiments, the operational configuration map may be included with the configurator operational input data in step 1340 to minimize modification of the existing operational design when incorporating additional changes to the operational input data.

Figures 7A, 7B:
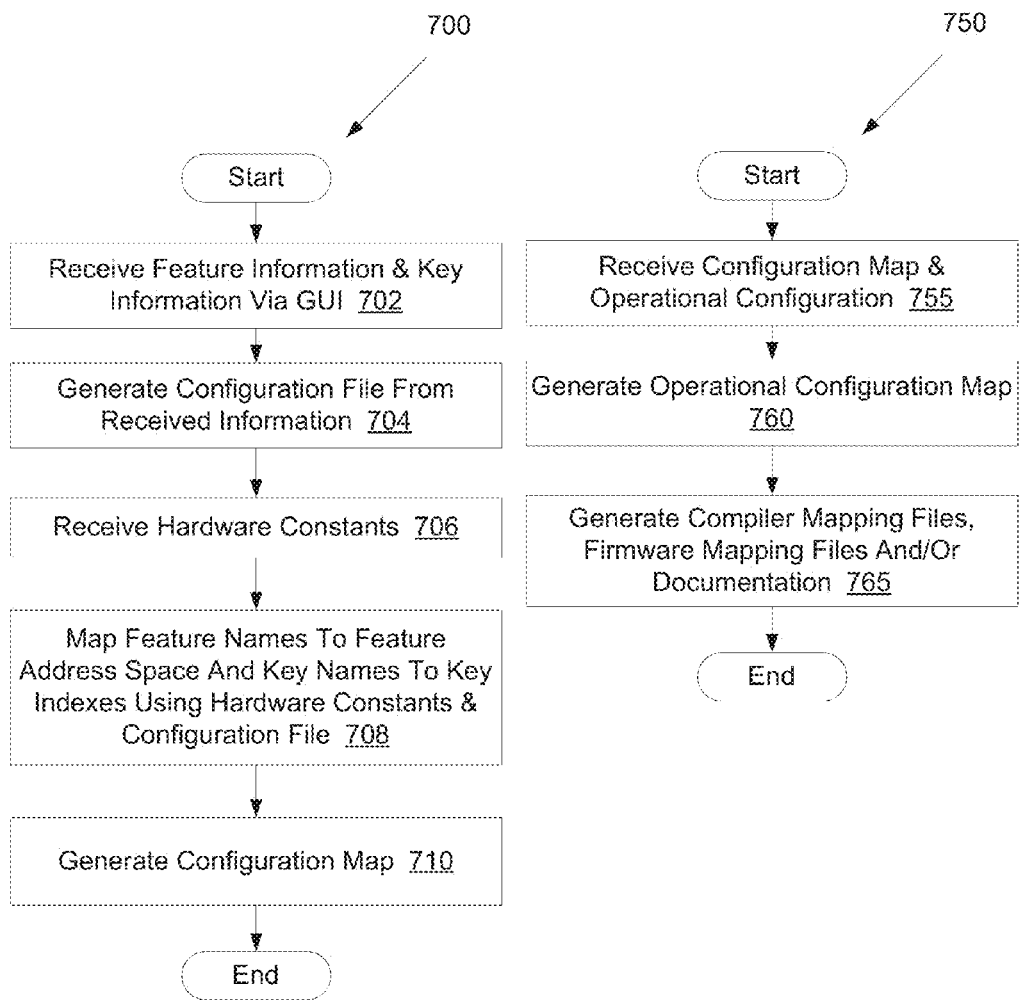
FIG. 7A is a flow chart of another example method for utilizing a configurator system during the hardware design process of a Security-Manager-enabled IC.
FIG. 7B is a flow chart of another example method for utilizing a configurator system after chip development.

FIG. 7A is a flow chart of another example method 700 for utilizing a configurator system during the hardware design process of a Security-Manager-enabled IC. At block 702 of method 700, processing logic receives feature information and key information via a graphical user interface. Alternatively, processing logic may receive the feature information and the key information via a command line interface, via an application programming interface (API), or via another interface. At block 704, processing logic generates a configuration file from the received information. The configuration file may include an identification of feature names for Features and feature bit widths associated with the feature names. The bit widths indicate a number of bits that are used by the associated feature name. The configuration file may additionally include key names and associated key sizes. The key sizes may be, for example, 128 bits and 256 bits.

At block 706, processing logic receives hardware constants. At block 708, processing logic maps the feature names to a feature address space of a security manager core. Similarly, processing logic maps the key names to a key interface of the security manager core. This may include mapping the key names to key indexes and/or key buses. The mapping of the feature names and the key names may be performed using the hardware constants and/or the configuration file. At block 710, processing logic generates a configuration map based on the mapping.

FIG. 7B is a flow chart of another example method 750 for utilizing a configurator system after chip development. At block 755 of method 750, processing logic receives a configuration map and an operational configuration. At block 760, processing logic generates an operational configuration map using the received configuration map and operational configuration. At block 765, processing logic generates one or more of compiler mapping files, firmware mapping files and documentation that incorporates the mapping.

FIG. 8A is a flow chart of one example method 800 for utilizing a configurator system to map Features to a feature address space of a security manager in an IC. At block 802 of method 800, processing logic receives a feature name of a Feature and a specified number of bits associated with the feature name.

At block 805, processing logic maps the feature name to a feature address space of a security manager core. In one embodiment, this includes identifying available feature bits at block 808 and allocating the specified number of bits to the feature name from the identified available feature bits at block 810. In one embodiment, processing logic searches for a sequence of bits that has a width that is at least the bit width (has the number of bits) to be used by the feature name. The allocated bits may then be allocated sequential bits.

At block 815, processing logic generates one or more HDL modules (e.g., Verilog modules) based on the mapping. At block 820, processing logic generates a configuration map that incorporates the mapping.

FIG. 8B is a flow chart of one example of a method 850 for utilizing a configurator system to map key names to key indexes of a security manager core. At block 852 of method 850, processing logic receives a key name and a specified number of bits (e.g., 128 bits or 256 bits) associated with the key name.

At block 855, processing logic maps the key name to a key interface of a security manager core (e.g., to a key index of the key interface). The key index may be one of multiple key indexes that are included in the key interface, and each may be associated with a particular key bus. In one embodiment, this includes identifying available key indexes/buses at block 860 having the specified number of bits and allocating an identified key bus to the key name from the identified key interface at block 865.

At block 880, processing logic generates one or more HDL modules (e.g., Verilog modules) based on the mapping. At block 885, processing logic generates a configuration map that incorporates the mapping.

Figure 9:
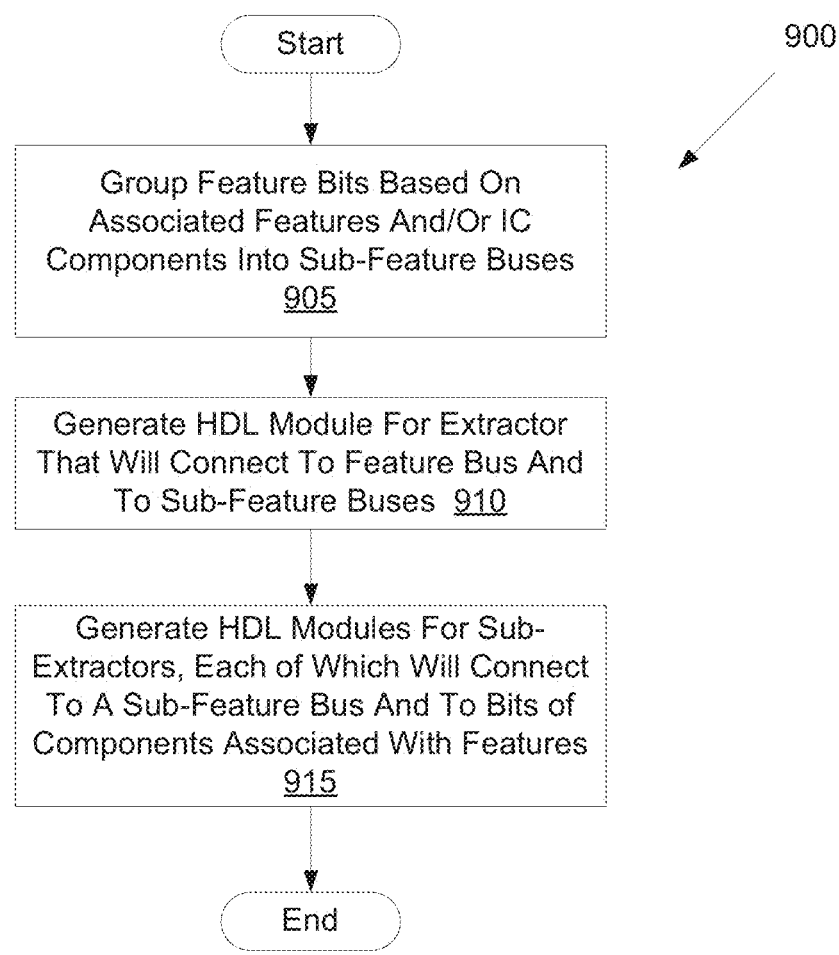
FIG. 9 is a flow chart of an example method for generating HDL modules for an extractor and for one or more sub-extractors.

FIG. 9 is a flow chart of an example method 900 for generating HDL modules for an extractor and for one or more sub-extractors. The security manager core may include a feature address space that has a set number of bits (e.g., 1056 bits, 2048 bits, 512 bits, etc.). Some or all of these bits may be associated with particular features of various components in the IC. It can be inefficient and computationally expensive to route bits of individual features from the security manager core to bits of components that provides those features for the IC. However, by grouping the bits into a series of buses the computational task of routing is significantly reduced. Once the feature bits are grouped into buses, the buses can be routed rather than routing individual bits or individual wires connecting the individual bits. Accordingly, complexity of the routing is significantly reduced.

Accordingly, at block 905 of method 900, processing logic groups feature bits based on associated Features and/or IC components into sub-feature buses. For example, all feature bits that will be connected to bits associated with features of a particular component on the IC may all be grouped into a single sub-feature bus. In one embodiment, feature bits are grouped based on sub-extractor definitions provided in a configuration file.

At block 910, processing logic generates an HDL module for an extractor. The extractor will be a hardware component that will connect to a feature bus, where the feature bus connects to some or all of the feature bits in the feature address space of the security manager core. The extractor will additionally connect to one or more sub-feature buses. Accordingly, the extractor may receive a signal from the security manager core via the feature bus, and send the signal along via an appropriate sub-feature bus.

At block 915, processing logic generates HDL modules for sub-extractors. Each of the sub-extractors will connect to one of the sub-feature buses. Each sub-extractor will additionally connect to bits of IC components that are associated with feature names represented by wires in the sub-feature buses. For example, a single sub-extractor will connect via a sub-feature bus to the extractor. The sub-extractor may receive a signal from the extractor via the sub feature bus. The received signal will be received via a particular wire of the sub-feature bus, and that particular wire may be associated with a feature name. Sub-extractor may route that signal to the connected bit on a component of the IC that is also associated with that feature name.

Figure 10:
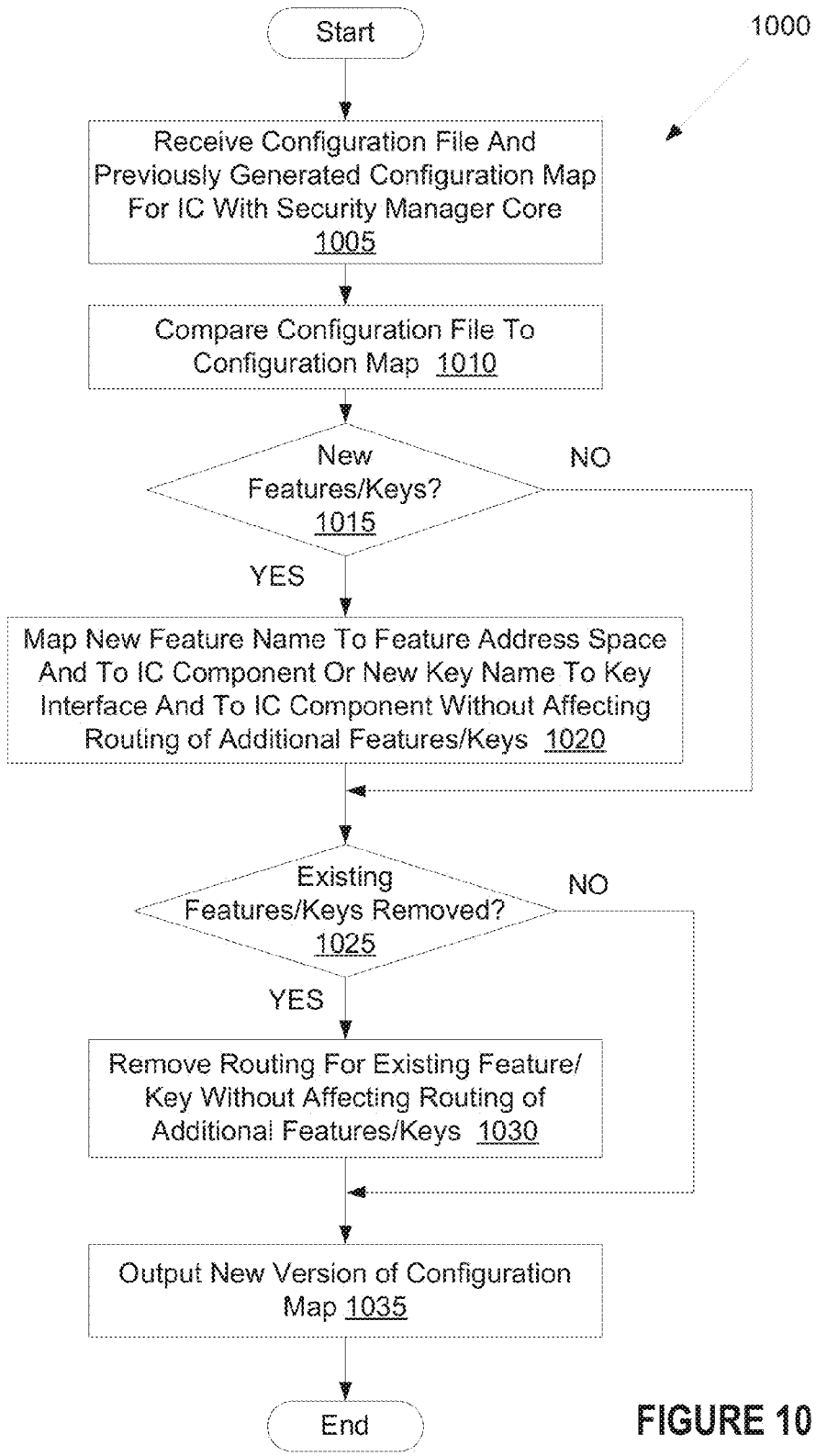
FIG. 10 is a flow chart of an example method for updating the routing between a security manager and additional components in an IC using a configurator.

FIG. 10 is a flow chart of an example method 1000 for updating the routing between a security manager core and additional components in an IC using a configurator. At block 1005 of method 1000, processing logic receives a configuration file and a previously generated configuration map for an IC with a security manager core. At block 1010, processing logic compares the received configuration file to the received configuration map. At block 1015, processing logic determines whether there are any new Features or keys represented in the configuration file based on the comparison. A new Feature may be identified if there is a new Feature name not represented in the previously generated configuration map. However, in some cases a feature name for an existing Feature may be changed. Accordingly, other parameters associated with a particular Feature may be compared between the configuration file and the generated configuration map to determine whether a Feature indicated in the configuration file is merely a new name for a Feature previously mapped in the configuration map. Such attributes as number of feature bits, designated feature bits from the feature address space, similarity in feature names, and so forth may be examined to make such a determination. A similar comparison and determination may be made to determine if there are any new keys. If there are new Features or new keys, the method continues to block 1020. Otherwise, the method proceeds to block 1025.

At block 1020, processing logic maps a new feature name of an identified new Feature to available feature bits of the feature address space (e.g., to an unused feature address space). Processing logic additionally maps the new feature bits to bits of a component of the IC. Processing logic may additionally or alternatively map the new key name to a key index of the key interface. Processing logic may additionally map the new Features and/or keys to appropriate IC components without affecting existing routing of other Features and keys. Thus, the computations that are performed for modifying an existing mapping may be much reduced as compared to those of generating a new mapping from scratch.

At block 1025, processing logic determines whether any existing Features or keys have been removed based on the comparison of the configuration file to the configuration map. It may be determined that a Feature was removed if a feature name is included in the configuration map but not in the configuration file. Similarly, it may be determined that a key was removed if it is included in the configuration map but not in the configuration file. If any Features or keys were removed, the method continues to block 1030. Otherwise, the method proceeds to block 1035.

At block 1030, processing logic removes the routing of the removed Features and/or keys. The routing of these Features and keys may be removed without affecting the routing of any other existing Features and keys.

At block 1035 a new version of the configuration map is output. Additionally, processing logic 1035 may output updated HDL modules for an extractor and for one or more sub-extractors.

In one embodiment, processing logic tracks a version number of the configuration map. When a new configuration map is generated, processing logic may assign a version number of 1 to that configuration map. When the configuration map is fed back into a configurator, processing logic may increment the version number of the configuration map. Different configuration map versions may be saved, and so at any time an engineer may revert back to a previously generated configuration map version.

Figure 11:
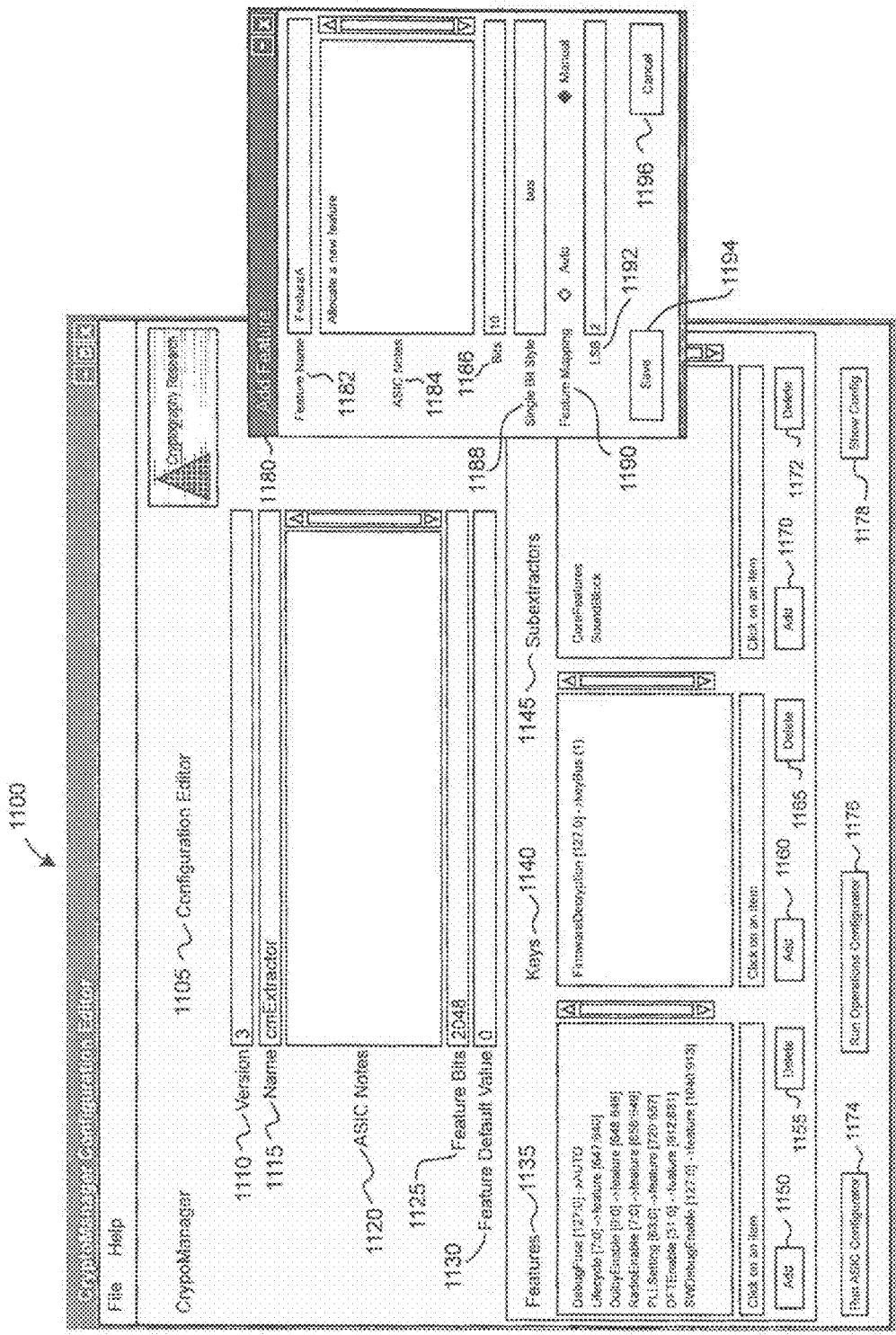
FIG. 11 illustrates a first view of a graphical user interface for using a configurator.

FIG. 11 illustrates a graphical user interface (GUI) 1100 for using a configurator. The graphical user interface 1100 provides a configuration editor 1105 that is usable to input data for features, keys and sub-extractors. Users may interact with the GUI 1100 to create a configuration file. Alternatively, users may manually create configuration files using a command line interface, an application programming interface (API), or other interface type.

The configuration editor 1105 may include text boxes to input a configuration file name 1115, to input ASIC notes 1120, to input a number of feature bits 1125 that will be available in the feature space of the security manager core, and to input a feature default value 1130. Feature bits may have a default value of 0, which causes the associated features to be disabled by default. Alternatively, feature bits may have a default value of 1, which causes the associated features to be enabled by default. The configuration editor may also have a version field 1110 that indicates a version number for an open configuration file. The version field is grayed out, indicating that in the illustrated embodiment the version field 1110 is not a user editable value. Instead, the configurator may automatically determine and set the version number.

The configuration editor 1105 further displays a features list 1135, a keys list 1140 and a sub-extractors list 1145. The features list indicates all of the Features that have been added for an integrated circuit that is being designed. Each entry in the features list 1135 represents a Feature of the integrated circuit that is being designed. Each entry may include a feature name, a number of bits that will be used by the feature, and the particular feature bits of the security manager core's feature space that the feature name has been assigned. For example, a first entry in the feature list has a feature name of DataFuse and uses 128 bits. The Feature having the DataFuse feature name includes a designation of "AUTO," indicating that no bits of the feature space have yet been allocated to this Feature. Once a configurator is run, the configurator will automatically assign feature bits to this Feature. A second example entry has a feature name of LifeCycle, uses 8 bits, and has been allocated feature bits 640 through 647 of the feature space.

The feature list 1135 additionally includes an add feature button 1150 and a delete feature button 1155. The add feature button 1150 may be used to add a new Feature, while the delete feature button 1155 may be used to delete an existing Feature from the features list 1135.

Responsive to a user interacting with (e.g., clicking on) the add feature button 1150 or selecting an entry from the feature list 1135, a feature window 1180 may be opened. The feature window 1180 includes text boxes (or other input areas) in which a user can input or edit parameters associated with a new or existing Feature. These text boxes include feature name 1182 in which a user can name a new Feature or rename an existing feature, ASIC notes 1184 in which a user can input notes about the Feature, bit width (number of bits) 1186 representing the number of bits that will be used by the Feature, and least significant bit 1192 that designates a particular feature bit of the feature address space to assign to the feature. The feature window 1180 may additionally include an option for a user to select a single bit style (e.g., as a bus or as a single independent line) 1188 and to select a feature mapping function 1190 as automatic or manual. Presently the feature mapping function 1190 is automatic, and so the single bit style will be automatically selected by the configurator (and is thus grayed out). The feature window 1180 additionally includes a save button 1194 useable to save a new Feature or changes to an existing Feature and a cancel button 1196 useable to cancel the new Feature or the changes to the existing Feature.

The keys list 1140 indicates all of the keys that have been added to the integrated circuit. Each entry in the keys list 1140 may represent a key. Each entry may include a key name, a key width for the key (number of bits used by the key) and an assigned key bus of the security manager core's key interface. An example key entry has the key name FirmwareDecryption and is a 128 bit key. This key has been mapped to keybus 1 of the key interface. Similar to the features list 1135, the keys list 1140 includes an add key button 1160 and a delete key button 1165. User interaction with the add key button 1160 or user selection of a key entry in the keys list 1140 may cause a key window (not shown) to display. The key window may be substantially similar to the illustrated feature window.

The sub-extractors list 1145 lists sub-extractor HDL modules that have been designated for the IC under design. Each entry in the sub-extractors list 1145 may represent a particular sub-extractor. The sub-extractors may be nameable by a user. A user may select an existing sub-extractor to bring up a sub-extractor window (shown in FIG. 12) for editing the existing sub-extractor, or may select the add sub-extractor button 1170 to bring up the sub-extractor window for creating a new sub-extractor. A user may also interact with a delete sub-extractor button 1172 to delete an existing sub-extractor.

The configuration editor 1105 may automatically generate and update a configuration file as a user interacts with the configuration editor 1105. Accordingly, users may input all of the data that will be used to map a security manager core to other components of an IC without having to know any particular syntax used by the configurator, and without having to manually create configuration files. This may simplify the task of designing ICs and of using the configurator.

The configuration editor 1105 additionally includes a run ASIC configurator 1174 button and a run operations configurator button 1176. Responsive to a user selecting the run ASIC configurator button 1174, the configurator may use the open configuration file along with associated hardware constants to perform one or more of the aforementioned methods related to the ASIC design phase. For example, the configurator may map feature names to a feature space and key names to a key interface of a security manager core, to create HDL modules for an extractor and sub-extractors, to route feature bits of the security manager core to bits of additional components of the IC, and so forth). Responsive to the user selecting the run operation configurator 1176, the configurator may use the configuration file, a configuration map generated during the ASIC design phase, and/or operational data to perform one or more of the aforementioned methods related to the operational design phase. For example, the configurator may create compiler mapping files, firmware mapping files and/or documentation.

The configuration editor 1105 additionally includes a show configuration button 1178, which a user may select to view a current configuration file that has been generated based on the user interaction with the configuration editor 1105. The show configuration button 1178 may also cause created documentation on the current IC to be displayed in some embodiments.

Figure 12:
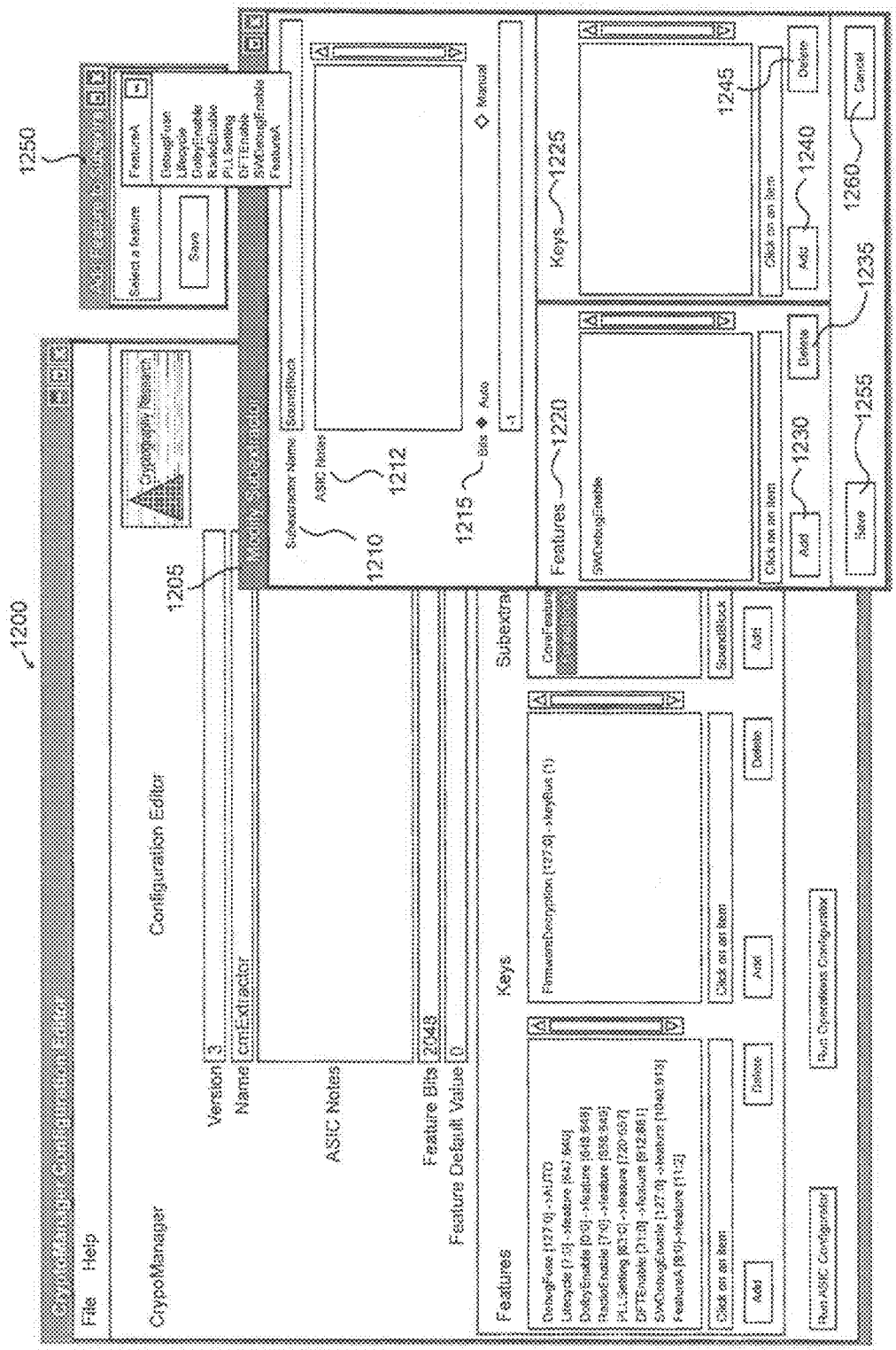
FIG. 12 illustrates a second view of a graphical user interface for using a configurator.

FIG. 12 illustrates a sub-extractor window 1205 of a graphical user interface for using a configurator. The sub-extractor window 1205 may be opened responsive to a user selecting an existing sub-extractor in the sub-extractors list 1145 or selecting the add sub-extractor button 1170. The sub-extractor window 1205 includes a text box for a sub-extractor name 1212, which a user can use to name a new sub-extractor or rename an existing sub-extractor. The sub-extractor window 1205 further includes an ASIC notes text box 1212. The sub-extractor window 1205 additionally includes a bits field 1215, in which a user can select whether the sub-extractor will route bits associated with the sub-extractor automatically using the configurator or manually. In the illustrated example automatic bit option is selected. Accordingly, the configurator will automatically route feature bits and/or key buses included in the sub-extractor.

The sub-extractor window 1205 additionally includes a features list 1220 and a keys list 1225. A user may add Features to the features list 1220 by selecting the add features button 1230, and may delete existing Features from the features list 1220 may selecting the delete features button 1235. Responsive to the user selecting the add feature button 1230, an add feature window may be displayed. The add feature window may include a list of all Features that have been added to the configuration file. Alternatively, the add features window 1250 may include available Features that have not already been assigned to another sub-extractor.

A user may add keys to the keys list using the add key button 1240, and may delete keys from the keys list using the delete key button 1245. The process of adding and deleting keys is substantially similar to the process of adding and deleting features.

Once a user has completed a sub-extractor (e.g., finished adding or editing features and keys for the sub-extractor), the user may select the save button 1255 to save his changes. He may also select the cancel button 1260 to undo his changes or otherwise cancel the add/modify sub-extractor operation.

In the illustrated example, a user inputs those features and keys that will be routed together by a single sub-extractor. Those selected features will be added to a sub-feature bus, and the selected keys may be routed using a shared key interface. In an alternative embodiment, no features or keys may be manually added to the sub-extractor, or not all keys/features to be included in the sub-extractor are manually added. Instead, the configurator may automatically determine which Features and which keys to include in particular sub-extractors in some embodiments. Additionally, the configurator may automatically generate sub-extractors and add Features/keys to those generated sub-extractors in some embodiments.

Figure 13:
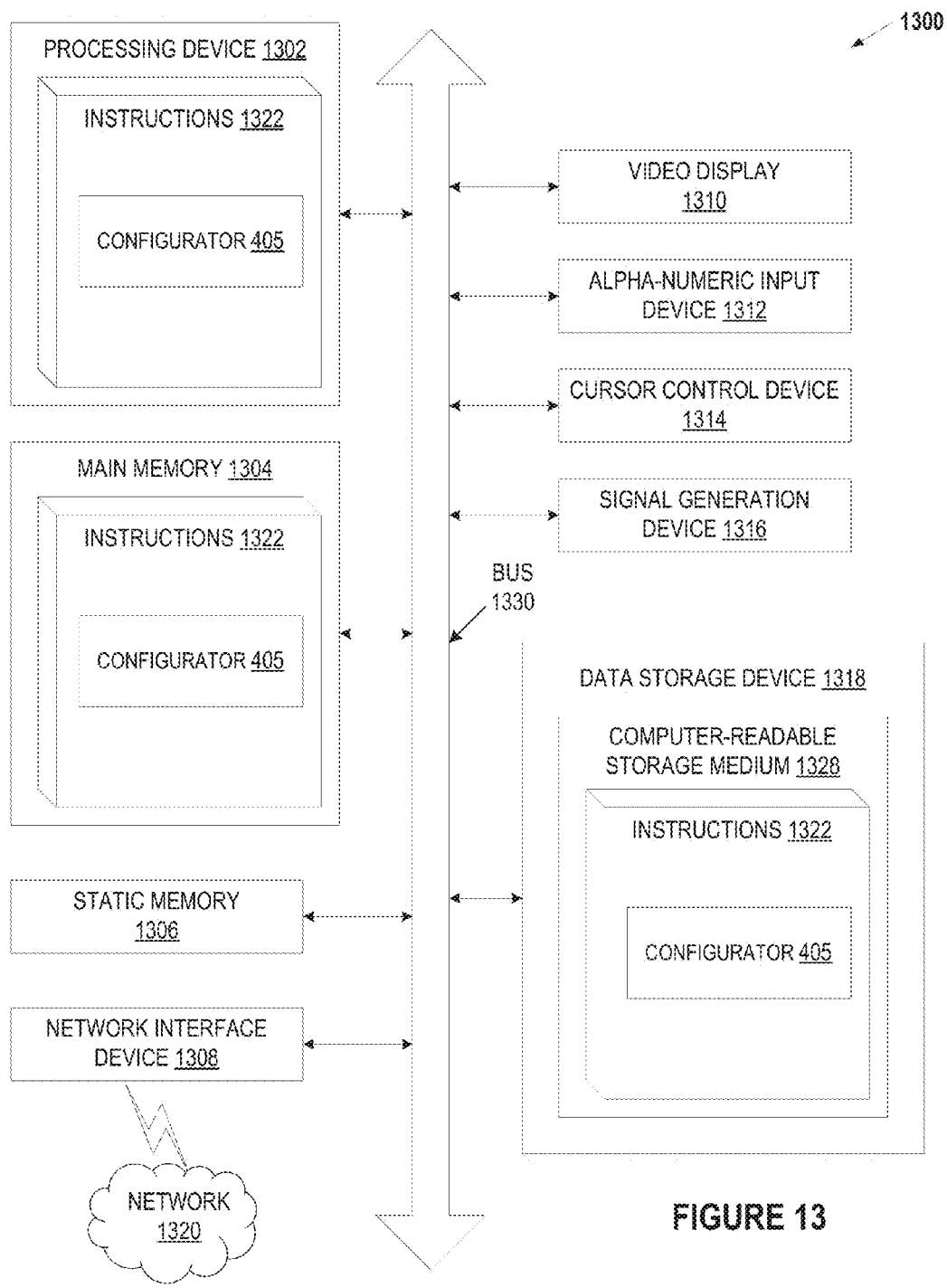
FIG. 13 illustrates a block diagram of one embodiment of a computing device.

FIG. 13 illustrates a diagrammatic representation of a machine in the example form of a computing device 1300 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1300 includes a processing device 1302, a main memory 1304 (e.g., read-only memory (ROM), flash memory, dynamic random access memory (DRAM) such as synchronous DRAM (SDRAM) or Rambus DRAM (RDRAM), etc.), a static memory 1306 (e.g., flash memory, static random access memory (SRAM), etc.), and a secondary memory (e.g., a data storage device 1318), which communicate with each other via a bus 1330.

Processing device 1302 represents one or more general-purpose processors such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. Processing device 1302 is configured to execute the processing logic (instructions 1322) for performing the operations and steps discussed herein.

The computing device 1300 may further include a network interface device 1308. The computing device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker).

The data storage device 1318 may include a machine-readable storage medium (or more specifically a computer-readable storage medium) 1328 on which is stored one or more sets of instructions 1322 embodying any one or more of the methodologies or functions described herein. The instructions 1322 may also reside, completely or at least partially, within the main memory 1304 and/or within the processing device 1302 during execution thereof by the computer system 1300, the main memory 1304 and the processing device 1302 also constituting computer-readable storage media.

The computer-readable storage medium 1328 may also be used to store a configurator 405 (as described with reference to FIG. 4), and/or a software library containing methods that call a configurator. While the computer-readable storage medium 1328 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

In the present disclosure a "computer" may include one or more processors, a memory, a data interface, a hardware security module, a display, or some combination thereof. The processor(s) can be a single or multiple microprocessors, field programmable gate arrays (FPGAs), or digital signal processors (DSPs) capable of executing particular sets of instructions. Some of the methods performed by the computer may be implemented using computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor (e.g., ROM or flash) memory. Alternatively, some of the methods can be implemented in hardware components or combinations of hardware and software such as, for example, ASICs, special purpose computers, or general purpose computers. Some embodiments may be implemented not only within an integrated circuit but also within computer-readable media. For example, these designs may be stored upon and/or embedded within computer-readable media associated with a software design tool used for designing integrated circuits. Examples include VHSIC Hardware Description Language (VHDL) netlists, Verilog Register Transfer Level (RTL) netlists, and transistor level (e.g., SPICE or SPICE related files) netlists. Note that such netlists may be synthesized as well as synthesizable. Computer-readable media also includes media having layout information such as a GDS-II file. Furthermore, netlist files or other computer-readable media for integrated circuit design may be used in a simulation environment to perform the methods of the designs described above.

Certain adaptations and modifications of the described embodiments can be made. Therefore, the above discussed embodiments are considered to be illustrative and not restrictive. Embodiments of the present application are not limited to any particular operating system, mobile device architecture, server architecture, or computer programming language.

What is claimed is:

1. A method comprising:
   receiving a feature name for an integrated circuit comprising a security manager core and an additional component, wherein a feature provided by the additional component is associated with the feature name;
   receiving a specified number of bits associated with the feature name;
   mapping, by a processing device, the feature name to a feature address space of the security manager core based at least in part on the specified number of bits; and
   generating a hardware description logic (HDL) module for an extractor that is to connect to a feature bus comprising a plurality of feature bits of the feature address space based on the mapping, wherein the extractor is further to group a subset of the plurality of feature bits that are associated with a related feature into a sub-feature bus, and wherein the HDL module is usable to configure the security manager core for delivery of a payload associated with the feature name to the additional component.

2. The method of claim 1, wherein mapping the feature name to the feature address space comprises:
   identifying available feature bits from the plurality of feature bits in the feature address space; and
   allocating, from the identified available feature bits, the specified number of bits to the feature name.

3. The method of claim 1, further comprising:
   generating a second HDL module for a sub-extractor that is to connect to the extractor and to the additional component of the integrated circuit, wherein the sub-extractor routes feature bits from the sub-feature bus comprising the allocated feature bits to input/outputs for features provided by the additional component.

4. The method of claim 2, wherein the allocated feature bits comprise wires that connect the security manager core to the additional component, the allocated feature bits being usable to enable and disable the feature on the additional component.

5. The method of claim 2, wherein the allocated feature bits comprise wires that carry data to be used internally to change the behavior of the security manager core.

6. The method of claim 1, further comprising mapping a key name to a key interface, wherein mapping the key name to the key interface comprises:
   receiving a second specified number of bits associated with the key name;
   identifying a plurality of available key buses having the second specified number of bits; and
   allocating a key bus to the key name from the identified plurality of available key buses, wherein the allocated key bus is usable to deliver a key associated with the key name to the additional component of the integrated circuit.

7. The method of claim 1, further comprising:
   receiving the specified number of bits and the feature name via a graphical user interface.

8. The method of claim 1, further comprising:
   generating a configuration file that comprises the feature name and the specified number of feature bits; and
   using the generated configuration file to perform the mapping.

9. The method of claim 1, further comprising generating an updated version of the HDL model, wherein generating the updated version comprises:
   generating a configuration map that comprises a result of the mapping;
   receiving a configuration file;
   comparing the configuration map to the received configuration file;
   responsive to determining that the configuration file lacks an existing feature included in the configuration map, generating said updated version of the at least one HDL module so that the existing feature is removed without affecting routing of additional features; and
   responsive to determining that the configuration file includes a new feature name not included in the configuration map, generating said updated version of the HDL module so that the new feature name is mapped to a previously unused feature address space without affecting the routing of additional features.

10. The method of claim 1, further comprising:
    generating a configuration map that comprises a result of the mapping; and
    outputting a firmware mapping file that comprises contents of the configuration map, wherein the firmware mapping file is usable by a device driver for the security manager core to deliver commands referencing the feature using the feature name and without specifying the allocated feature bits.

11. The method of claim 1, further comprising:
    generating a configuration map that comprises a result of the mapping; and
    outputting a compiler mapping file that comprises the configuration map, wherein the compiler mapping file further comprises definitions that enable programmers of the security manager core to write commands using the feature name without specifying the feature bits mapped to the feature name, and wherein the commands comprise commands for determining a value currently associated to the feature.

12. A non-transitory computer readable medium comprising instructions that, when executed by a processing device, cause the processing device to perform operations comprising:
    receiving a feature name for an integrated circuit comprising a security manager core and an additional component, wherein a feature provided by the additional component is associated with the feature name;
    receiving a specified number of bits associated with the feature name;
    mapping, by the processing device, the feature name to a feature address space of the security manager core based at least in part on the specified number of bits; and
    outputting a result of the mapping for an extractor that is to connect a feature bus comprising a plurality of feature bits of the feature address space, wherein the extractor is further to group a subset of the plurality of feature bits that are associated with a related feature into a sub-feature bus, and wherein the result of the mapping is usable to configure the security manager core for delivery of a payload associated with the feature name to the additional component.

13. The non-transitory computer readable medium of claim 12, wherein mapping the feature name to the feature address space comprises:
   identifying available feature bits from the plurality of feature bits in the feature address space; and
   allocating, from the identified available feature bits, the specified number of bits to the feature name.

14. The non-transitory computer readable medium of claim 13, wherein outputting the result of the mapping comprises:
   generating a HDL module for an extractor that is to connect to the feature bus comprising the plurality of feature bits of the feature address space, wherein the extractor groups subsets of the plurality of feature bits that are associated with related features into sub-feature buses.

15. The non-transitory computer readable medium of claim 14, wherein outputting the result of the mapping further comprises:
   generating a second HDL module for a sub-extractor that is to connect to the extractor and to the additional component of the integrated circuit, wherein the sub-extractor routes feature bits from the sub-feature bus comprising the allocated feature bits to input/outputs for features provided by the additional component.

16. The non-transitory computer readable medium of claim 13, wherein the allocated feature bits comprise wires that connect the security manager core to the additional component, the allocated feature bits being usable to enable and disable the feature on the additional component.

17. The non-transitory computer readable medium of claim 13, wherein the allocated feature bits comprise wires that carry data to be used internally to change the behavior of the security manager core.

18. The non-transitory computer readable medium of claim 12, further comprising mapping a key name to a key interface, wherein mapping the key name to the key interface comprises:
   identifying a plurality of available key buses having a second specified number of bits; and
   allocating a key bus to the key name from the identified plurality of available key buses, wherein the allocated key bus is usable to deliver a key associated with the key name to the additional component of the integrated circuit.

19. A computing device comprising:
   a memory; and
   a processing device connected to the memory, the processing device to:
      receive a feature name for an integrated circuit comprising a security manager core and an additional component that provides a feature associated with the feature name;
      receive a specified number of bits associated with the feature name;
      map the feature name to a feature address space of the security manager core based at least in part on the specified number of bits; and
      generate a hardware description logic (HDL) module for an extractor that is to connect to a feature bus comprising a plurality of feature bits of the feature address space based on the mapping, wherein the extractor is further to group a subset of the plurality of feature bits that are associated with a related feature into a sub-feature bus, and wherein the HDL module is usable to configure the security manager core for delivery of a payload associated with the feature name to the additional component.

* * * * *